US007787569B2

(12) United States Patent
Hayem et al.

(10) Patent No.: US 7,787,569 B2
(45) Date of Patent: Aug. 31, 2010

(54) RADIO FREQUENCY INTEGRATED CIRCUIT HAVING FREQUENCY DEPENDENT NOISE MITIGATION WITH SPECTRUM SPREADING

(75) Inventors: Frederic Christian Marc Hayem, San Diego, CA (US); Hooman Darabi, Irvine, CA (US); Mike (Hon Fai) Chu, Sunnyvale, CA (US); Anatoly Gelman, San Diego, CA (US); Kiran Puttegowda, Irvine, CA (US); Ahmadreza (Reza) Rofougaran, Newport Coast, CA (US); Maryam Rofougaran, Rancho Palos Verdes, CA (US); Claude G. Hayek, Huntington Beach, CA (US); Nelson R. Sollenberger, Farmingdale, NJ (US); Ronish Patel, East Windsor, NJ (US)

(73) Assignee: Broadcom Corporation, Irvine, CA (US)

( * ) Notice: Subject to any disclaimer, the term of this patent is extended or adjusted under 35 U.S.C. 154(b) by 690 days.

(21) Appl. No.: 11/641,562

(22) Filed: Dec. 18, 2006

(65) Prior Publication Data
US 2008/0024339 A1 Jan. 31, 2008

Related U.S. Application Data

(63) Continuation-in-part of application No. 11/494,147, filed on Jul. 26, 2006.

(51) Int. Cl.
*H03K 9/00* (2006.01)
*H04L 27/00* (2006.01)
*H04B 1/00* (2006.01)

(52) U.S. Cl. .................. 375/316; 375/144; 375/148

(58) Field of Classification Search ................. 324/309; 327/156; 342/70; 375/144, 148, 316; 455/553.1, 455/87, 269, 318, 76, 63.1
See application file for complete search history.

(56) References Cited

U.S. PATENT DOCUMENTS

| 5,565,870 | A  | * | 10/1996 | Fukuhara et al. | ............... 342/70 |
| 6,327,298 | B1 | * | 12/2001 | Grobert | ...................... 375/148 |
| 7,035,611 | B2 | * | 4/2006 | Garlepp et al. | ............... 455/269 |
| 7,200,364 | B2 | * | 4/2007 | Lim et al. | ...................... 455/76 |
| 2002/0079892 | A1 | * | 6/2002 | Baumgartl et al. | .......... 324/309 |
| 2002/0173271 | A1 | * | 11/2002 | Blair et al. | ..................... 455/63 |
| 2002/0193140 | A1 | * | 12/2002 | Behrens et al. | ............. 455/553 |
| 2003/0017809 | A1 | * | 1/2003 | Garlepp et al. | ................ 455/87 |

(Continued)

*Primary Examiner*—David C Payne
*Assistant Examiner*—Erin M File
(74) *Attorney, Agent, or Firm*—Garlick Harrison & Markison; Bruce E. Stuckman

(57) ABSTRACT

A radio frequency integrated circuit (RFIC) includes a low noise amplifier that amplifies an inbound radio frequency (RF) signal to produce an amplified RF signal. A down conversion module converts the amplified RF signal to a down converted signal based on a local oscillation. An analog to digital conversion (ADC) module coupled to convert the down converted signal into a digital signal. A baseband processing module converts the digital signal into inbound data, wherein at least one function of the baseband processing module is clocked by a plurality of baseband clock signals A clock module produces the plurality of baseband clock signals, wherein the clock module detects an interference condition when frequency dependent noise components associated with at least one of the plurality of baseband clock signals are inside a frequency band associated with the inbound RF signal, and spreads the spectrum of the at least one of the plurality of baseband clock signals when the interference condition is detected.

23 Claims, 18 Drawing Sheets

U.S. PATENT DOCUMENTS

2003/0202562 A1* 10/2003 Cai .......................... 375/144
2004/0077327 A1* 4/2004 Lim et al. ................. 455/318
2008/0180143 A1* 7/2008 Shigemori et al. .......... 327/156

* cited by examiner

RADIO FREQUENCY INTEGRATED CIRCUIT HAVING FREQUENCY DEPENDENT NOISE MITIGATION WITH SPECTRUM SPREADING

CROSS REFERENCE TO RELATED PATENTS

The present application is a continuation-in-part of pending U.S. patent application Ser. No. 11/494,147, filed Jul. 26, 2006, entitled, INTEGRATED CIRCUIT HAVING FREQUENCY DEPENDENT NOISE AVOIDANCE, filed on Jul. 26, 2006.

In addition, the present application is related to U.S. patent application Ser. No. 11/641,553, entitled, RADIO FREQUENCY INTEGRATED CIRCUIT HAVING FREQUENCY DEPENDENT NOISE AVOIDANCE, filed concurrently herewith.

BACKGROUND OF THE INVENTION

1. Technical Field of the Invention

This invention relates generally to integrated circuits and more particularly to noise control within integrated circuits, such as RF integrated circuits.

2. Description of Related Art

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Many integrated circuits include circuitry that is sensitive to noise and circuitry that produces noise. For example, a radio frequency integrated circuit (RFIC), which may be used in a cellular telephone, wireless local area network (WLAN) interface, broadcast radio receiver, two-way radio, etc., includes a low noise amplifier (LNA) that is susceptible to adverse performance due to noise and also includes an analog to digital converter and other digital circuitry that produce noise. To prevent the noise from adversely affecting the noise sensitive circuits (e.g., the LNA) many noise reduction concepts have been developed.

The simplest noise reduction concept is to put noise sensitive circuits on a different IC die than noise producing circuits. While this solves the noise sensitivity issue, it does not provide the reduction in form factor that many products and/or devices are required to have. Another technique is to have the noise sensitive circuits on separate power supply lines (e.g., positive rail, negative rail, and/or return) and connected together off-chip. Other techniques include layout management, shielding, etc.

While each of these techniques provides varying levels of noise management, their effectiveness is reduced as the fabrication process of integrated circuit shrink and/or as more circuits are placed on the same integrated circuit die. Therefore, a need exists for an integrated circuit that reduces the adverse affects of noise.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
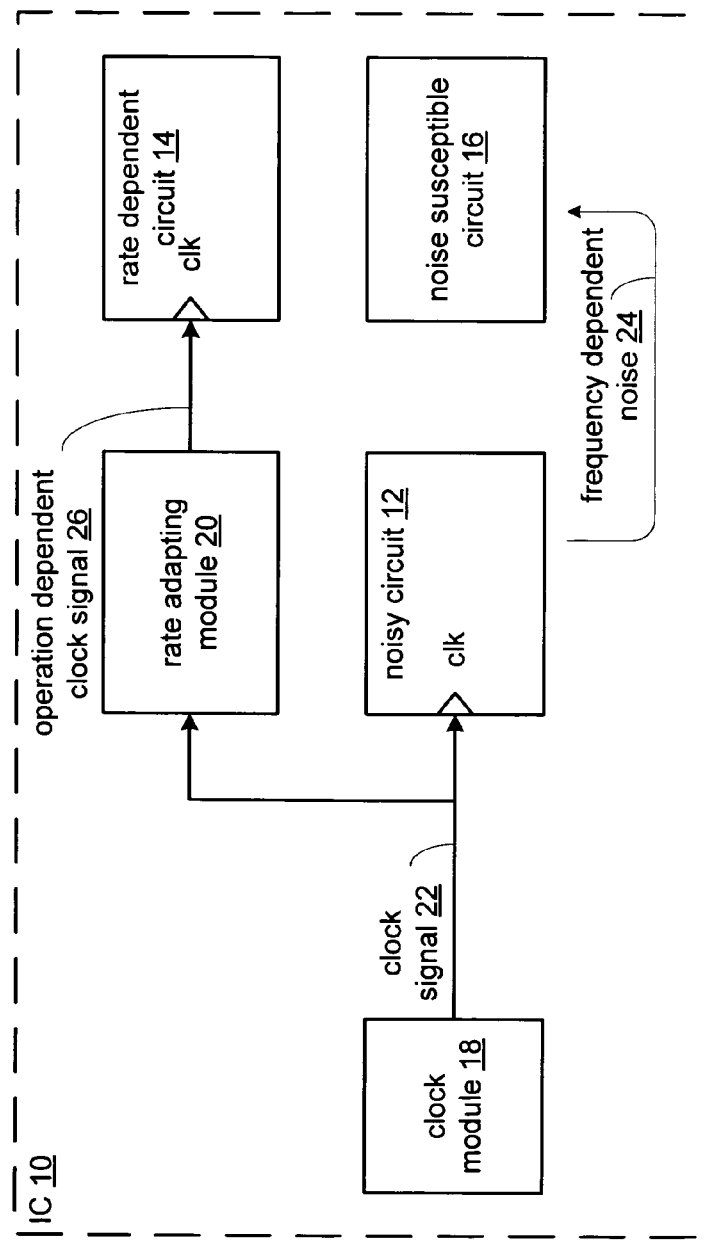
FIG. 1 is a schematic block diagram of an embodiment of an integrated circuit in accordance with the present invention.

FIG. 1 is a schematic block diagram of an embodiment of an integrated circuit (IC) 10 that includes a noisy circuit 12, a rate dependent circuit 14, a noise susceptible circuit 16, a clock module 18, and a rate adapting module 20. The circuits 12, 14, and 16 may be any type of analog and/or digital circuits that can be implemented on an integrated circuit including, but not limited to, amplifiers, memory, microprocessors, microcontrollers, baseband processing module, digital signal processors, digital logic circuitry, multipliers, adders, arithmetic logic units, analog to digital converters, digital to analog converters, sensors, impedance matching circuits, input-output circuits, state machines, mixers, and control logic.

The clock module 18, which may be a fractional-N frequency synthesizer, a direct digital frequency synthesizer, a phase locked loop, and/or any circuit that generates a sinusoidal or square wave repetitive signal at a desired rate, generates a clock signal 22. The noisy circuit 12 is clocked based on the clock signal 22 and when operating causes frequency dependent noise. For instance, the noisy circuit 12 may be clocked directly from the clock signal 22, a multiple of the clock signal 22, or a fraction of the clock 22 and causes frequency dependent noise 24 to be present in the IC 10. The frequency dependent noise 24, which may be harmonic signal components, spurs, and/or digital noise, may appear on the substrate of the IC 10, on the positive supply voltage rail, on negative supply voltage rail, a voltage return rail and/or be introduced into a circuit or other module via electromagnetic cross-coupling noise introduced on control lines or other inputs, etc.

The noise susceptible circuit 16 is susceptible to adverse performance when the frequency dependent noise 24 has a component within a given frequency range. The given frequency range may be associated with the bandwidth of signals processed by the noise susceptible circuit 16 and/or may be a range of operating frequencies of the noise susceptible circuit 16. To minimize the adverse performance of the noise susceptible circuit 16 due to the frequency dependent noise 24, the rate of the clock signal 22 is set such that components of the frequency dependent noise 24 associated with the clock signal 22 are outside the given frequency range.

The rate dependent circuit 14 requires a specific clock rate (which may be at a different rate than that of the clock signal 22) to perform one or more of its functions is clocked based on an operation dependent clock signal 26. The rate adapting module 20, which may be a fractional-N frequency synthesizer, a direct digital frequency synthesizer, a phase locked loop, and/or digital logic circuitry (e.g., a digital delay line to produce a plurality of delayed clock signals from the clock signal 22, a plurality of inverters to produce a plurality of inverted delayed clock signals, a multiplexer to select one of the plurality of delayed or inverted delayed clock signals to clock a D flip-flop), is coupled to produce the operation dependent clock signal 26 from the clock signal 22.

In one embodiment, the rate adapting module 20 establishes the operational dependent clock signal 26 by establishing an adjustment factor based on the rate dependency of the rate dependent circuit 14 and the clock signal 22. For example, if the rate dependency of the rate dependent circuit 14 is 100 MHz and the clock signal 22 has a rate of 105 MHz, the adjustment factor is 100/105. Having established the adjustment factor, the rate adapting module 20 adjusts the rate of the clock signal 22 based on the adjustment factor to produce the operation dependent clock signal 26.

In one embodiment, the clock module 18 determines whether components of the frequency dependent noise 24 are within the given frequency range for an initial rate of the clock signal 22. The initial rate of the clock signal 22 may be set at desired rate for the rate dependent circuit 14, a multiple thereof, and/or a fraction thereof. Note that the determining may be done by calculating frequency of the components of the frequency dependent noise 24 based on the initial clock rate. Alternatively, the IC 10 may be operated in a test mode at the initial rate of the clock signal 22 and monitoring performance of the noise susceptible circuit 16. If noise susceptible circuit 16 experiences minimal adverse affects due to the frequency dependent noise 24 then it can be assumed that there are no significant components of the frequency dependent noise in the given frequency range.

When the frequency dependent noise components are within the given frequency range, the clock module 18 adjusts the rate of the clock signal 22 such that the frequency dependent noise components associated with the clock signal 22 are outside the given frequency range. In one embodiment, the clock module 18 adjusts the rate of the clock signal 22 by calculation. For instance, if the given frequency range is from 960 MHz to 1040 MHz, and the initial rate of the clock is 100 MHz, the tenth harmonic of the clock signal 22 is 1000 MHz and is within the given frequency range. As such, the clock module 18 determines that a clock rate of 105 MHz produces a ninth harmonic at 945 MHz and a tenth harmonic at 1050 MHz, both of which are outside of the given frequency range. Alternatively, the clock module 18 may use a clock rate of 95 MHz, which has a tenth harmonic at 950 MHz and an eleventh harmonic at 1045 MHz, both of which are outside the given frequency range.

In another embodiment, the clock module 18 may incrementally increase or decrease the rate of the clock signal 22 during a test mode, where the IC 10 monitors for adverse performance of the noise susceptible circuit 14 due to the frequency dependent noise 24. When an acceptable level of performance is obtained for a given rate of the clock signal, it is used for the clock signal 22. Note that in any of the embodiments of FIGS. 1-8, an interpolating and/or anti-aliasing filter may be required between the noisy circuit and the rate dependent circuit if the noisy circuit and rate dependent circuit are coupled in a series fashion.

Figure 2:
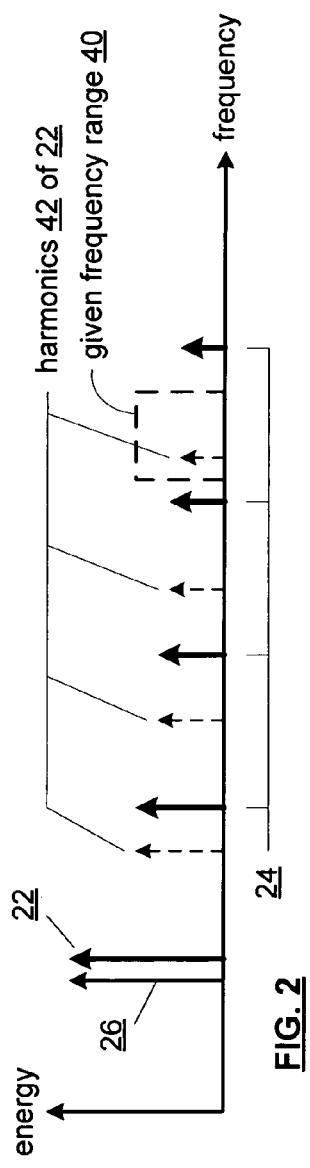
FIG. 2 is a frequency diagram of clock adjusting in accordance with the present invention.

FIG. 2 is a frequency diagram of an example of clock adjusting within the IC 10 of FIG. 1. In this illustration, the fundamental frequency of the operation dependent clock signal 26 includes harmonics 42 that are illustrated using dashed lines. If this rate were used for the clock signal 22, then there would be a harmonic within the given frequency range 40, which might adversely affect the performance of the noise susceptible circuit. As such, the rate of the clock signal 22 is adjusted such that the fundamental frequency of the clock signal 22 is greater than or less than (shown as greater than) the rate of the operation dependent clock signal 26. By adjusting the rate of the clock signal 22, its harmonic components are also adjusted and can be adjusted to be outside the given frequency range 40. However, the rate dependent circuit 14 requires a clock based on the operation dependent clock signal 25, which is derived from the clock signal 22 by the rate adapting module.

Figure 3:
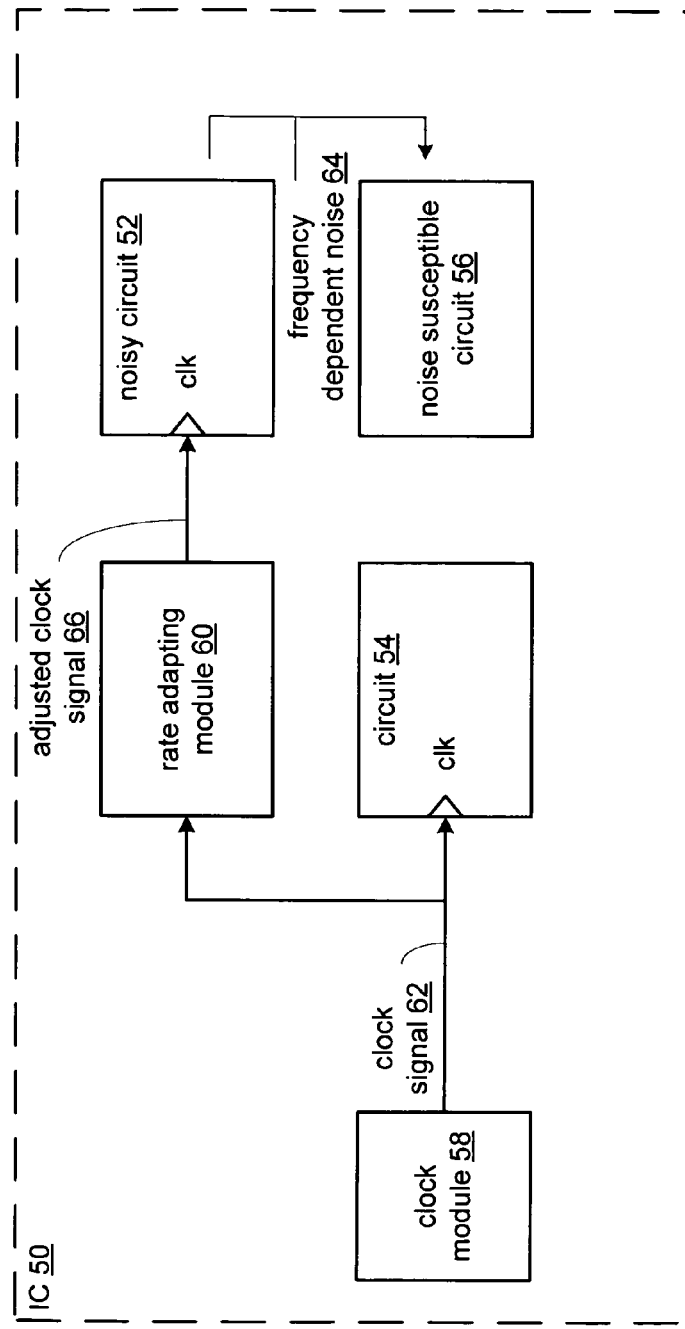
FIG. 3 is a schematic block diagram of another embodiment of an integrated circuit in accordance with the present invention.

FIG. 3 is a schematic block diagram of another embodiment of an integrated circuit (IC) 50 that includes a noisy circuit 52, a circuit 54, a noise susceptible circuit 56, a clock module 58, and a rate adapting module 60. The circuits 52, 54, and 56 may be any type of analog and/or digital circuits that can be implemented on an integrated circuit including, but not limited to, amplifiers, memory, microprocessors, microcontrollers, digital signal processors, baseband processing module, digital logic circuitry, multipliers, adders, arithmetic logic units, analog to digital converters, digital to analog converters, sensors, impedance matching circuits, input-output circuits, state machines, mixers, and control logic.

The clock module 58, which may be a fractional-N frequency synthesizer, a direct digital frequency synthesizer, a phase locked loop, and/or any circuit that generates a sinusoidal or square wave repetitive signal at a desired rate, generates a clock signal 62. The clock module 58 provides the clock signal 62, a multiple thereof, or a fraction thereof to the circuit 54, which requires a specific clock rate to perform one or more of its functions. Accordingly, the clock module 58 sets the rate of the clock signal 62 to provide the desired clock for the circuit 54. However, if the clock signal 62 were used to clock the noisy circuit 52, frequency dependent noise 64 would be within a given frequency range of the noise susceptible circuit 56.

The noise susceptible circuit 56 is susceptible to adverse performance when the frequency dependent noise 64 has a component within a given frequency range. The given frequency range may be associated with the bandwidth of signals processed by the noise susceptible circuit 56 and/or may be a range of operating frequencies of the noise susceptible circuit 56. To minimize the adverse performance of the noise susceptible circuit 56 due to the frequency dependent noise 64, the rate of the adjusted clock signal 66 is set such that frequency dependent noise 64 associated with the adjusted clock signal 66 is outside the given frequency range.

To move the frequency dependent noise 64 outside of the given frequency range, the rate adapting module 60, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), is coupled to produce the adjusted clock signal 66 from the clock signal 62. The rate adapting module 60 provides the adjusted clock signal to the noisy circuit 52.

The noisy circuit 52 is clocked based on the adjusted clock signal 66 and when operating causes frequency dependent noise 64. For instance, the noisy circuit 52 may be clocked directly from the adjusted clock signal 66, a multiple of the adjusted clock signal 66, or a fraction of the adjusted clock signal 66 and causes frequency dependent noise 64 to be present in the IC 10. The frequency dependent noise 64, which may be harmonic signal components, spurs, and/or digital noise, may appear on the substrate of the IC 50, on the positive supply voltage rail, on negative supply voltage rail, a voltage return rail and/or be introduced into a circuit or other module via electromagnetic cross-coupling noise introduced on control lines or other inputs, etc.

In one embodiment, the rate adapting module 60 establishes the adjusted clock signal 66 by establishing an adjustment factor based on the given frequency range and the clock signal 62. For example, if the given frequency range is 960 MHz to 1040 MHz and the rate of the clock signal 62 is 100 MHz, then the clock signal has a tenth harmonic at 1000 MHz. The rate adapting module 60 may then determine the adjustment factor as 960/1000 or 1040/1000. Having established the adjustment factor, the rate adapting module 60 adjusts the rate of the clock signal 62 based on the adjustment factor to produce the adjusted clock signal 66.

In one embodiment, the rate adapting module 60 determines whether components of the frequency dependent noise 64 are within the given frequency range for the clock signal 62. Note that the determining may be done by calculating the frequency of the components of the frequency dependent noise 64 based on the clock rate. Alternatively, the IC 50 may be operated in a test mode at the rate of the clock signal 62 and monitoring performance of the noise susceptible circuit 56. If noise susceptible circuit 56 experiences minimal adverse affects due to the frequency dependent noise 64 then it can be assumed that there are no significant components of the frequency dependent noise in the given frequency range.

When the frequency dependent noise components are within the given frequency range, the rate adapting module 60 adjusts the rate of the clock signal 62 such that the frequency dependent noise components associated with the adjusted clock signal 66 are outside the given frequency range. In one embodiment, the rate adapting module 60 adjusts the rate of the clock signal 62 by calculation. For instance, if the given frequency range is from 960 MHz to 1040 MHz, and the rate of the clock is 100 MHz, the tenth harmonic of the clock signal 62 is 1000 MHz and is within the given frequency range. As such, the rate adapting module 60 determines that a clock rate of 105 MHz produces a ninth harmonic at 945 MHz and a tenth harmonic at 1050 MHz, both of which are outside of the given frequency range. Alternatively, the rate adapting module 60 may use a clock rate of 95 MHz, which has a tenth harmonic at 950 MHz and an eleventh harmonic at 1045 MHz, both of which are outside the given frequency range.

In another embodiment, the rate adapting module 60 may incrementally increase or decrease the rate of the adjusted clock signal 66 during a test mode, where the IC 50 monitors for adverse performance of the noise susceptible circuit 54 due to the frequency dependent noise 64. When an acceptable level of performance is obtained for a given rate of the adjusted clock signal, it is used for the adjusted clock signal 66.

Figure 4:
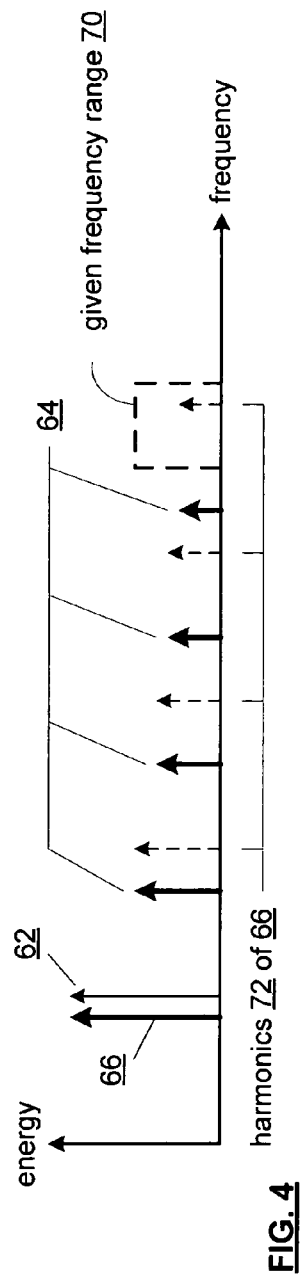
FIG. 4 is a frequency diagram of clock adjusting in accordance with the present invention.

FIG. 4 is a frequency diagram of an example of clock adjusting within the IC 50 of FIG. 3. In this illustration, the fundamental frequency of the clock signal 62 includes harmonics 42 that are illustrated using dashed lines. If this rate were used to clock the noisy circuit 52, then there would be a harmonic within the given frequency range 70, which might adversely affect the performance of the noise susceptible circuit 56. As such, the rate of the adjusted clock signal 66 is established such that its fundamental frequency is greater than or less than (shown as less than) the rate of the clock signal 62. By adjusting the rate of the adjusted clock signal 66, its harmonic components are also adjusted and can be adjusted to be outside the given frequency range 70.

Figure 5:
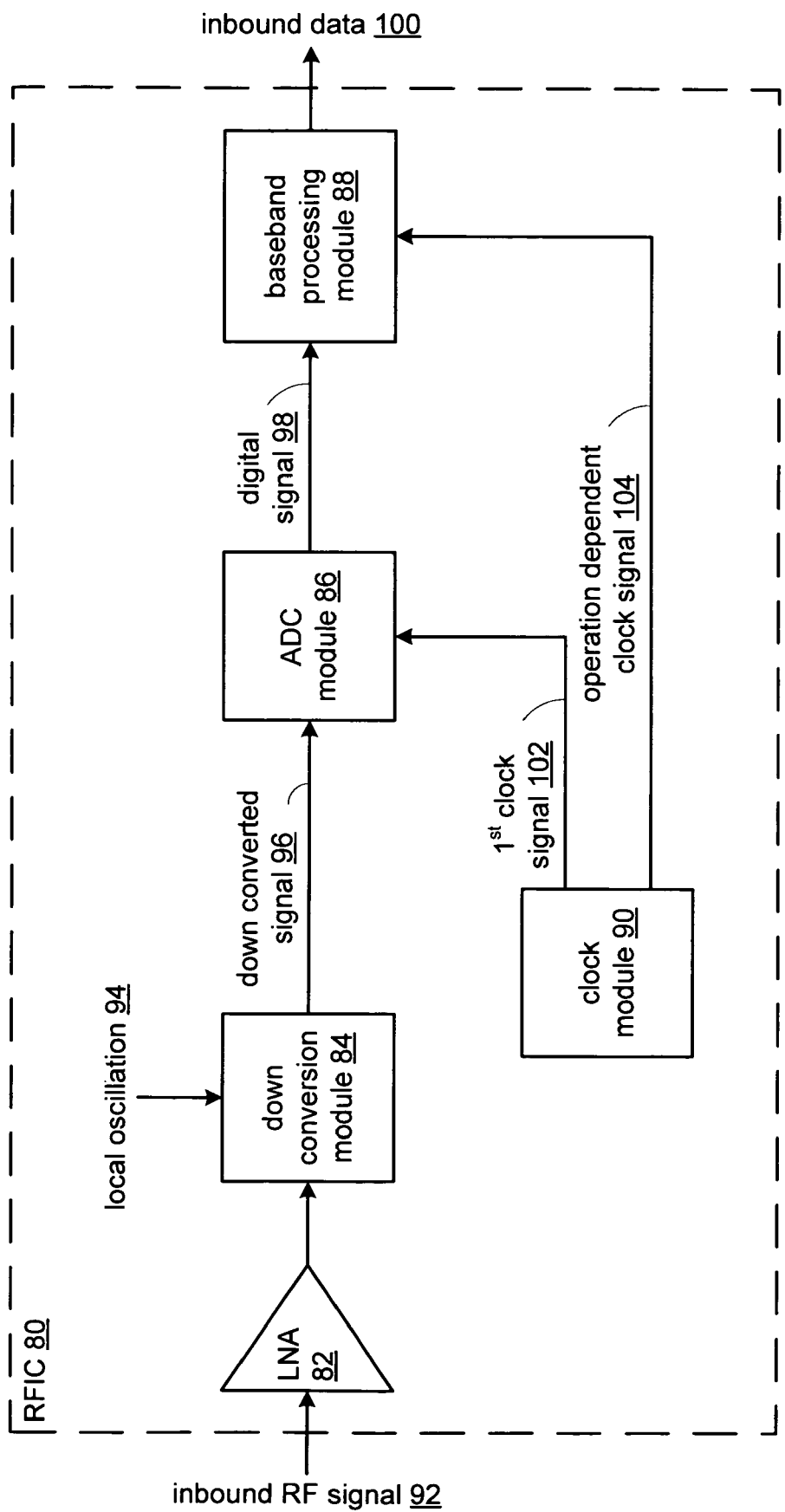
FIG. 5 is a schematic block diagram of an embodiment of a radio frequency integrated circuit in accordance with the present invention.

FIG. 5 is a schematic block diagram of an embodiment of a radio frequency integrated circuit (RFIC) 80 that includes a low noise amplifier 82, a down conversion module 84, an analog to digital converter module 86, a baseband processing module 88, and a clock module 90. The baseband processing module 88 executes digital receiver functions that include, but are not limited to, digital intermediate frequency to baseband conversion, demodulation, demapping, depuncturing, decoding, and/or descrambling. The baseband processing module 88 may be implemented using a processing device and may have associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 88 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

In operation, the RFIC 80 receives inbound RF signals 92 via an antenna, which were transmitted by a base station, an access point, or another wireless communication device. The antenna provides the inbound RF signals 92 to the low noise amplifier (LNA) 82, which amplifies the signals 92 to produce an amplified inbound RF signals. The conversion mixing module 84 converts the amplified inbound RF signals into a down converted signal 96, which may be an intermediate frequency or be at baseband, based on a local oscillation module 94.

The analog-to-digital converter module 86 converts the down converted signal 96 from the analog domain to the digital domain to produce a digital signal 98. The baseband processing module 88 decodes, descrambles, demaps, de-framing, and/or demodulates the digital signal 98 to recapture inbound data 100 in accordance with a particular wireless communication standard being implemented by the RFIC 80. Note that an interpolating and/or anti-aliasing filter may be required between the ADC module 86 and the baseband processing module 88, where the interpolating and/or anti-aliasing filter is clocked at a rate based on the operation dependent clock signal 104. Further note that each function of the baseband processing module 88 may be clocked from the same clock, different clocks, or a combination thereof. As such, the operation dependent clock signal 104 may include one or more clock signals.

In this embodiment, the clock module 90 generates a first clock signal 102 and an operation dependent clock signal 104 such that the rate of the first clock signal 102 is set such that frequency dependent noise components associated with the first clock signal 102 are outside a frequency band associated with the inbound RF signal 92 and the rate of the operation dependent clock signal 104 is set based on processing specifications of the digital signal 98. The processing specifications include rates for one or more of framing, demapping, deinterleave, IFFT, decoding, descramble, etc.

The ADC module 86 is clocked by the first clock signal 102 and generates frequency dependent noise that may be present in the RFIC 80. The frequency dependent noise, which may be harmonic signal components, spurs, and/or digital noise, may appear on the substrate of the IC 80, on the positive supply voltage rail, on negative supply voltage rail, and/or on a voltage return rail. The baseband processing module 88 is clocked by the operation dependent clock 104 to produce the inbound data 100 from the digital signal 98. In this manner, the frequency dependent noise components produced by the digital portion of the ADC module 86 do not adversely interfere with the LNA's 82 amplifying of the inbound RF signal 92 and yet the baseband processing module 88 is clocked at a rate required to recover the inbound data 100.

As one of ordinary skill in the art will appreciate, buffering may be required between noisy circuits and operation rate dependent circuits to compensate for the different clocking rates. Alternatively, the clock module and/or the rate adapting module may include a sample rate converter to accommodate the differences in clocking rates.

Figure 6:
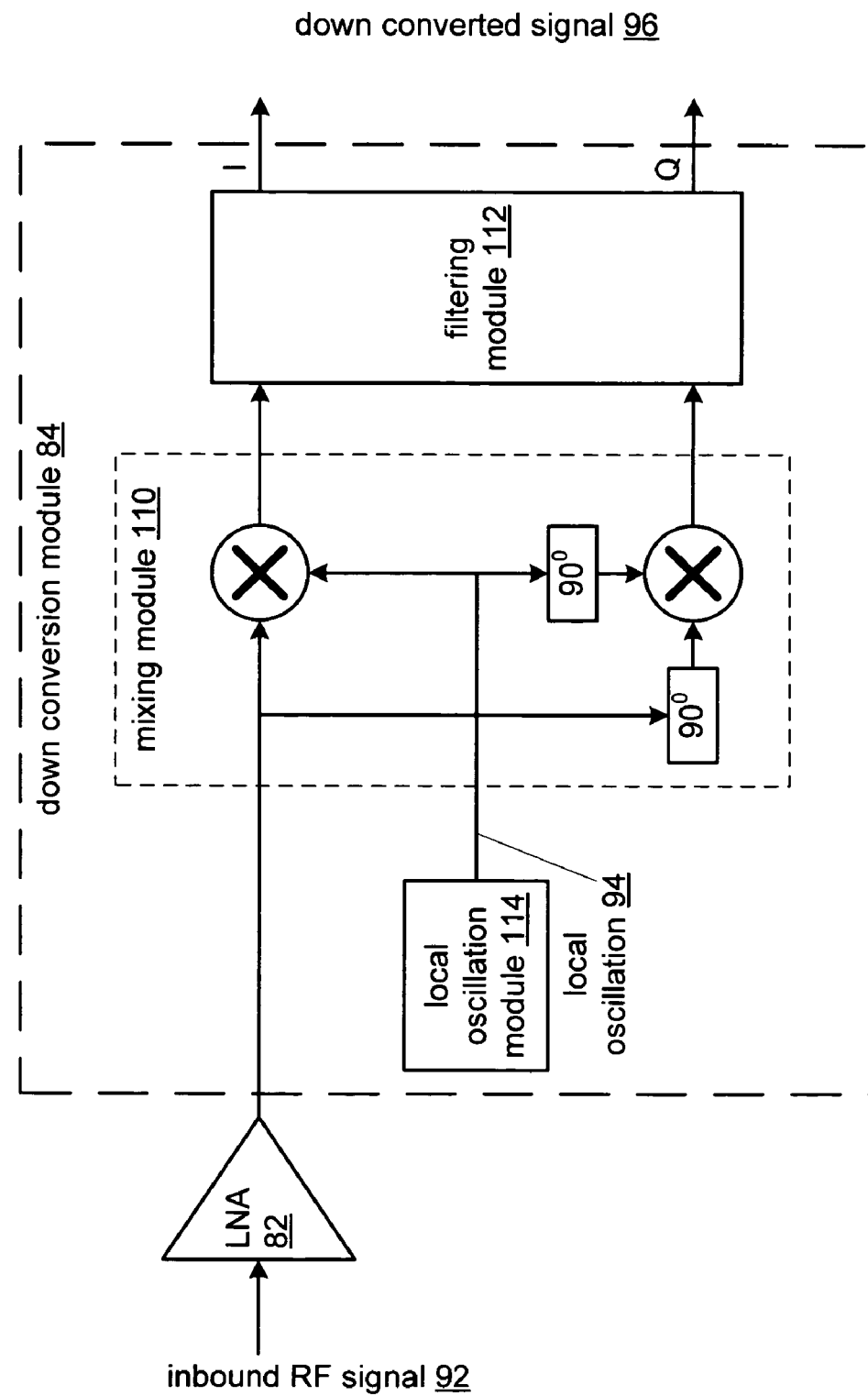
FIG. 6 is a schematic block diagram of an embodiment of a down conversion module in accordance with the present invention.

FIG. 6 is a schematic block diagram of an embodiment of a down conversion module 84 that includes a local oscillation module 114, a mixing module 110, and a filtering module 112. The mixing module 110 includes a pair of mixers and a pair of 90° phase shift modules. The first mixer mixes the amplified inbound RF signal 92 with the local oscillation 94 to produce a first mixed signal. The second mixer mixes a 90° phase shifted version of the amplified inbound RF signal 92 with a 90° phase shifted version of the local oscillation 94 to produce a second mixed signal.

The filtering module 112 filters out higher frequency components of the first and second mixed signals to produce an in-phase component and a quadrature component of the down converted signal 96. Note that to process the in-phase component and a quadrature component of the down converted signal 96, the ADC module 86 would include two ADCs; one for each signal component. Alternatively, a single ADC can be clocked at twice the frequency and shared by the in-phase and quadrature phase sections.

Figure 7:
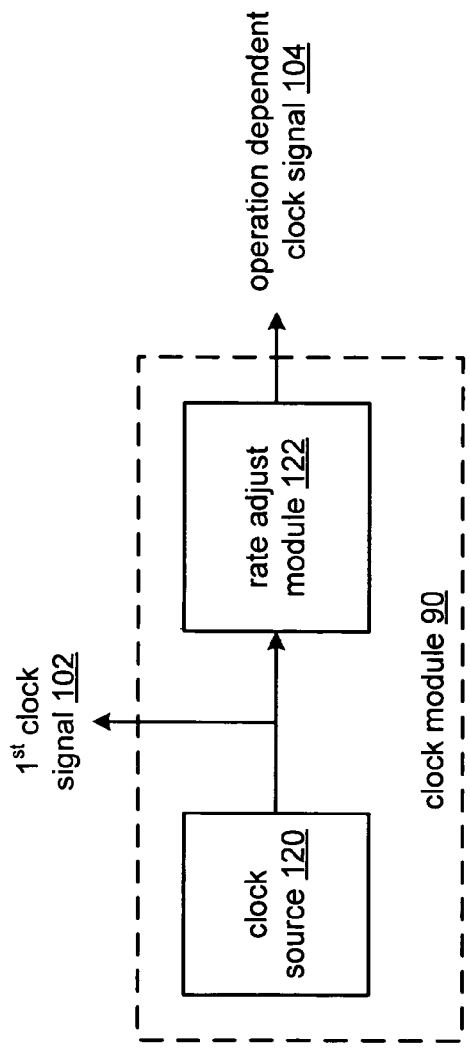
FIG. 7 is a schematic block diagram of an embodiment of a clock module in accordance with the present invention.

FIG. 7 is a schematic block diagram of an embodiment of a clock module 90 that includes a clock source 120 and a rate adjust module 122. The clock source 120, which may be a fractional-N frequency synthesizer, a direct digital frequency synthesizer, a phase locked loop, generates the first clock signal 102.

The rate adjust module 122, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), generates the operation dependent clock 104 from the first clock signal 102.

In one embodiment, the clock source 120 determines whether components of the frequency dependent noise are within the given frequency range of the inbound RF signal. Note that the determining may be done by calculating frequency of the components of the frequency dependent noise based on an initial setting of the first clock signal 102 and the given frequency range. Alternatively, the RFIC 80 may be operated in a test mode at the initial rate of the first clock signal 102 and monitoring performance of the LNA 82. If LNA 82 experiences minimal adverse affects due to the frequency dependent noise then it can be assumed that there are no significant components of the frequency dependent noise in the given frequency range.

When the frequency dependent noise components are within the given frequency range, the clock source 120 adjusts the rate of the first clock signal 102 such that the frequency dependent noise components associated with the first clock signal 102 are outside the given frequency range. In one embodiment, the clock source 120 adjusts the rate of the first clock signal 102 by calculation. For instance, if the given frequency range is from 960 MHz to 1040 MHz, and the initial rate of the first clock is 100 MHz, the tenth harmonic of the first clock signal 102 is 1000 MHz and is within the given frequency range. As such, the clock source 120 determines that a clock rate of 105 MHz produces a ninth harmonic at 945 MHz and a tenth harmonic at 1050 MHz, both of which are outside of the given frequency range. Alternatively, the clock source 120 may use a clock rate of 95 MHz, which has a tenth harmonic at 950 MHz and an eleventh harmonic at 1045 MHz, both of which are outside the given frequency range.

In another embodiment, the clock source 120 may incrementally increase or decrease the rate of the first clock signal 102 during a test mode, where the RFIC 80 monitors for adverse performance of the LNA 82 due to the frequency dependent noise. When an acceptable level of performance is obtained for a given rate of the first clock signal, it is used for the first clock signal 102.

Figure 8:
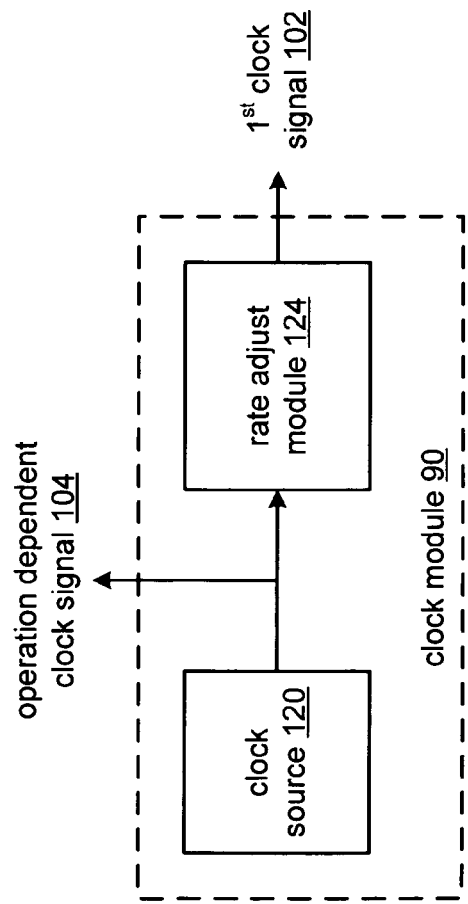
FIG. 8 is a schematic block diagram of another embodiment of a clock module in accordance with the present invention.

FIG. 8 is a schematic block diagram of another embodiment of a clock module 90 that includes the clock source 120 and a rate adjust module 124. The clock source 120, which may be a fractional-N frequency synthesizer, a direct digital frequency synthesizer, a phase locked loop, generates the operation dependent clock signal 104.

The rate adjust module 124, which may be a fractional-N frequency synthesizer, a direct digital frequency synthesizer, a phase locked loop, and/or digital logic circuitry (e.g., a digital delay line to produce a plurality of delayed clock signals from the clock signal 62, a plurality of inverters to produce a plurality of inverted delayed clock signals, a multiplexer to select one of the plurality of delayed or inverted delayed clock signals to clock a D flip-flop), generates the first clock signal 102 from the operation dependent clock signal 104.

In one embodiment, the rate adjust module 124 establishes the first clock signal 102 by establishing an adjustment factor based on the given frequency range and the operation dependent clock signal 104. For example, if the given frequency range is 960 MHz to 1040 MHz and the rate of the operation dependent clock signal 104 is 100 MHz, then the operation dependent clock signal has a tenth harmonic at 1000 MHz. The rate adjust module 124 may then determine the adjustment factor as 960/1000 or 1040/1000. Having established the adjustment factor, the rate adjust module 124 adjusts the rate of the operation dependent clock signal 104 based on the adjustment factor to produce the first clock signal 102.

In one embodiment, the rate adjust module 124 determines whether components of the frequency dependent noise are within the given frequency range. Note that the determining may be done by calculating frequency of the components of the frequency dependent noise based on the clock rate. Alternatively, the RFIC 80 may be operated in a test mode at the rate of the operation dependent clock signal 104 and monitoring performance of the LNA 82. If LNA 82 experiences minimal adverse affects due to the frequency dependent noise then it can be assumed that there are no significant components of the frequency dependent noise in the given frequency range.

When the frequency dependent noise components are within the given frequency range, the rate adjust module 124 adjusts the rate of the first clock signal 102 such that the frequency dependent noise components associated with the first clock signal 102 are outside the given frequency range. In one embodiment, the rate adjust module 124 adjusts the rate of the operation dependent clock signal 104 by calculation. For instance, if the given frequency range is from 960 MHz to 1040 MHz, and the rate of the operation dependent clock is 100 MHz, the tenth harmonic of the operation dependent clock signal 104 is 1000 MHz and is within the given frequency range. As such, the rate adjust module 124 determines that a clock rate of 105 MHz produces a ninth harmonic at 945 MHz and a tenth harmonic at 1050 MHz, both of which are outside of the given frequency range. Alternatively, the rate adjust module 124 may use a clock rate of 95 MHz, which has a tenth harmonic at 950 MHz and an eleventh harmonic at 1045 MHz, both of which are outside the given frequency range.

In another embodiment, the rate adjust module 124 may incrementally increase or decrease the rate of the first clock signal 102 during a test mode, where the RFIC 80 monitors for adverse performance of the LNA 82 due to the frequency dependent noise. When an acceptable level of performance is obtained for a given rate of the first clock signal, it is used for the first clock signal 102.

Figure 9:
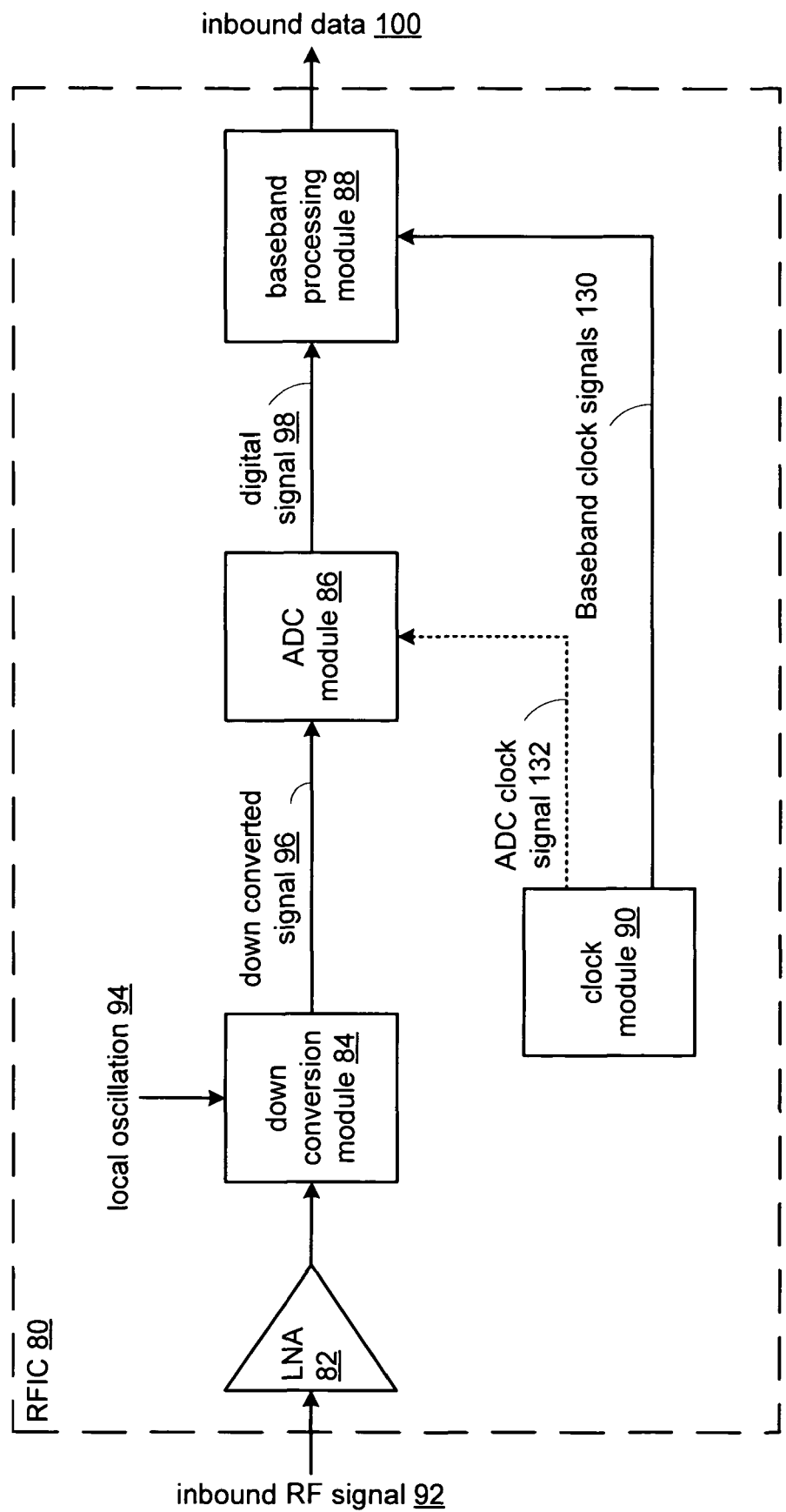
FIG. 9 is a schematic block diagram of an embodiment of a radio frequency integrated circuit in accordance with the present invention.

FIG. 9 is a schematic block diagram of an embodiment of a radio frequency integrated circuit in accordance with the present invention. Clock module 90 generates a plurality of baseband clock signals 130 that clock one or more functions of baseband processing module 88. The baseband clock signals are generated to reduce potential interference generated by the harmonics, spurs or other frequency dependent noise components of these clock signals falling within the passband of the RF front end of RFIC 80, generally set to correspond to the frequency band associated with possible carrier frequencies of the inbound RF signal 92. In one embodiment of the present invention, when frequency dependent noise components of one or more of the clock signals 130 fall within a frequency band associated with the inbound RF signal 92, the clock signals are either adjusted in frequency so that frequency dependent noise components fall outside of this frequency band, or the spectrum of the clock signals are spread to place some of the signal energy from the frequency dependent noise components outside of this frequency band.

In particular, RFIC 80 includes a low noise amplifier 82 that is coupled to amplify an inbound radio frequency (RF) signal 92 to produce an amplified RF signal. Down conversion module 84 is coupled to convert the amplified RF signal to a down converted signal 96 based on a local oscillation. Analog to digital conversion (ADC) module 86 is coupled to convert the down converted signal into a digital signal 98. Baseband processing module 88 is coupled to convert the digital signal 98 into inbound data 100. At least one function of the baseband processing module 88 is clocked by a plurality of baseband clock signals 130. The possible functions of baseband processing module 88 include intermediate frequency to baseband conversion, fast Fourier transform, demapping, deinterleaving, decoding, descrambling and other signal processing functions that can be dependent on one or more clock signals for timing thereof.

In one embodiment, the clock module 90 is coupled to produce the plurality of baseband clock signals 130 such that the rate of each of the plurality of baseband clock signals is set such that frequency dependent noise components associated with each of the plurality of baseband clock signals 130 fall outside a frequency band associated with the inbound RF signal 92. As will be discussed in greater detail in conjunction with FIGS. 12 and 13, the clock module 90 can optionally operate to reduce the effect of the frequency dependent noise components by spreading the spectrum of one or more of the baseband clock signals 130.

In a similar fashion to the embodiments previously described, the ADC conversion module 86 can clocked by an ADC clock signal 132, such as the $1^{st}$ clock signal 102. In this case, the clock module 90 produces the ADC clock signal 132 at a rate such that frequency dependent noise components associated with the ADC clock signal are outside the frequency band associated with the inbound RF signal 92.

As discussed in conjunction with FIG. 6, the down conversion module 84 can include a local oscillation module 114 that is coupled to generate the local oscillation 94 based on the operation dependent clock signal, a mixing module 110 that is coupled to mix the local oscillation 94 with the amplified RF signal to produce first and second mixed signals, and a filtering module 112 that is coupled to filter the first and second mixed signals to produce an in-phase component and a quadrature component of the down converted signal 96.

Figure 10:
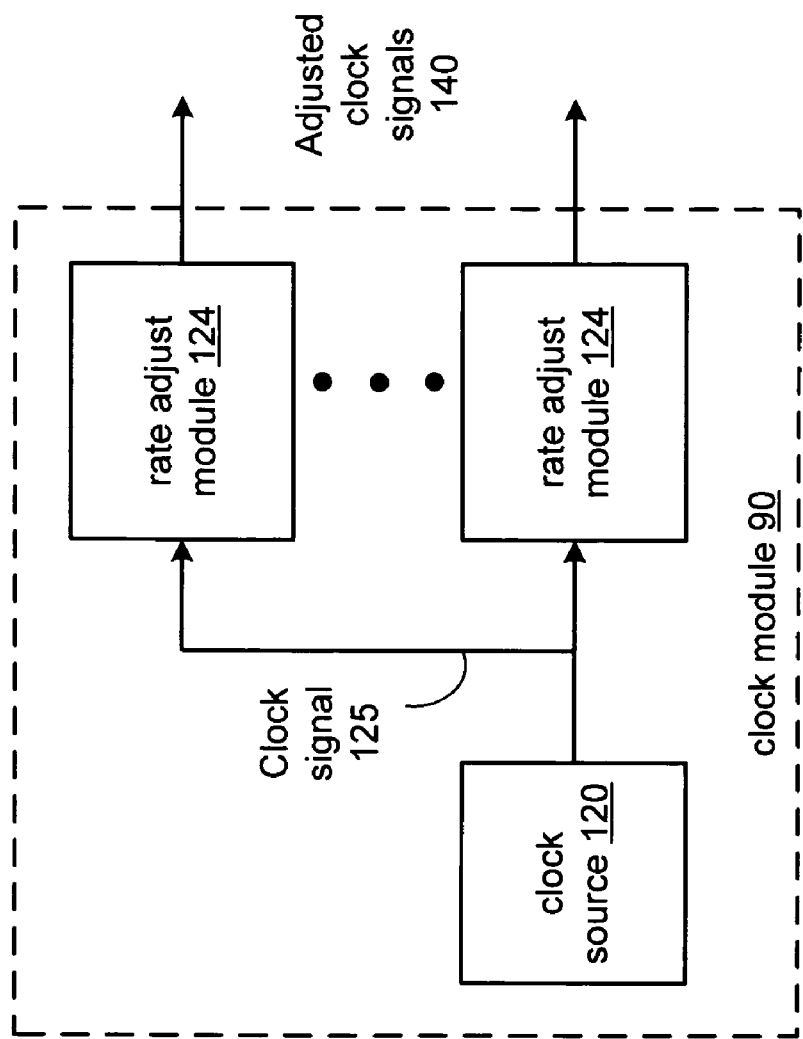
FIG. 10 is a schematic block diagram of an embodiment of a clock module in accordance with the present invention.

FIG. 10 is a schematic block diagram of an embodiment of a clock module in accordance with the present invention. In particular, clock module 90 includes a clock source 120 that generates an operation dependent clock signal 104. In an embodiment of the present invention, the operation dependent clock signal has a frequency that varies based on the desired channel and/or carrier frequency of the inbound RF signal 92 that is to be received. The local oscillation is generated based on this operation dependent clock signal 104 to down convert the inbound RF signal 92 as previously discussed. The plurality of rate adjust modules 124, in turn, generate the plurality of baseband clock signals from the operation dependent clock signal. In the parallel configuration shown, each of the rate adjust modules are independent and can each adjust the frequency of the operation dependent clock signal 104 to form adjusted clock signals 140, such as the baseband clock signals 130 and the ADC clock signal 132, such that the frequency dependent noise components of these adjusted clock signals 140 avoid the frequency range of the input that is susceptible to noise. As previously discussed, each of these rate adjust modules 124 can be implemented using fractional-N frequency synthesizers, direct digital frequency synthesizer, a phase locked loop, a frequency divider and/or other digital logic circuitry.

In one embodiment, the rate adjust module 124 produces its corresponding adjusted clock signal 140 by establishing an adjustment factor based on the given frequency range and the operation dependent clock signal 104. For example, if the given frequency range is 960 MHz to 1040 MHz and the rate of the operation dependent clock signal 104 is 100 MHz, then the operation dependent clock signal has a tenth harmonic at 1000 MHz and an interference condition is detected. The rate adjust module 124 may then determine the adjustment factor as 960/1000 or 1040/1000. Having established the adjustment factor, the rate adjust module 124 adjusts the rate of the operation dependent clock signal 104 based on the adjustment factor to produce the corresponding adjusted clock signal 140.

In one embodiment, the rate adjust module 124 determines whether components of the frequency dependent noise are within the given frequency range. Note that the determining may be done by calculating frequency of the components of the frequency dependent noise based on the clock rate. Alternatively, the RFIC 80 may be operated in a test mode at the rate of the operation dependent clock signal 104 to monitor performance of the LNA 82 to detect an interference condition based on one or more receiver parameters such as signal to noise ratio, signal to interference ratio, bit error rate, noise power or other receiver parameter that either directly or indirectly indicates the presence or absence of noise. If LNA 82 experiences minimal adverse affects due to the frequency dependent noise then it can be assumed that there are no significant components of the frequency dependent noise in the given frequency range.

When the frequency dependent noise components are within the given frequency range, the rate adjust module 124 adjusts the rate of the first clock signal 102 such that the frequency dependent noise components associated with the adjusted clock signal 140 are outside the given frequency range. In one embodiment, the rate adjust module 124 adjusts the rate of the operation dependent clock signal 104 by calculation. For instance, if the given frequency range is from 960 MHz to 1040 MHz, and the rate of the operation dependent clock is 100 MHz, the tenth harmonic of the operation dependent clock signal 104 is 1000 MHz and is within the given frequency range. As such, the rate adjust module 124 determines that a clock rate of 105 MHz produces a ninth harmonic at 945 MHz and a tenth harmonic at 1050 MHz, both of which are outside of the given frequency range. Alternatively, the rate adjust module 124 may use a clock rate of 95 MHz, which has a tenth harmonic at 950 MHz and an eleventh harmonic at 1045 MHz, both of which are outside the given frequency range.

In another embodiment, the rate adjust module 124 may incrementally increase or decrease the rate of the adjusted clock signal 140 during a test mode, where the RFIC 80 monitors for adverse performance of the LNA 82 due to the frequency dependent noise. When an acceptable level of performance is obtained for a given rate of the first clock signal, it is used for the adjusted clock signal 140.

Figure 11:
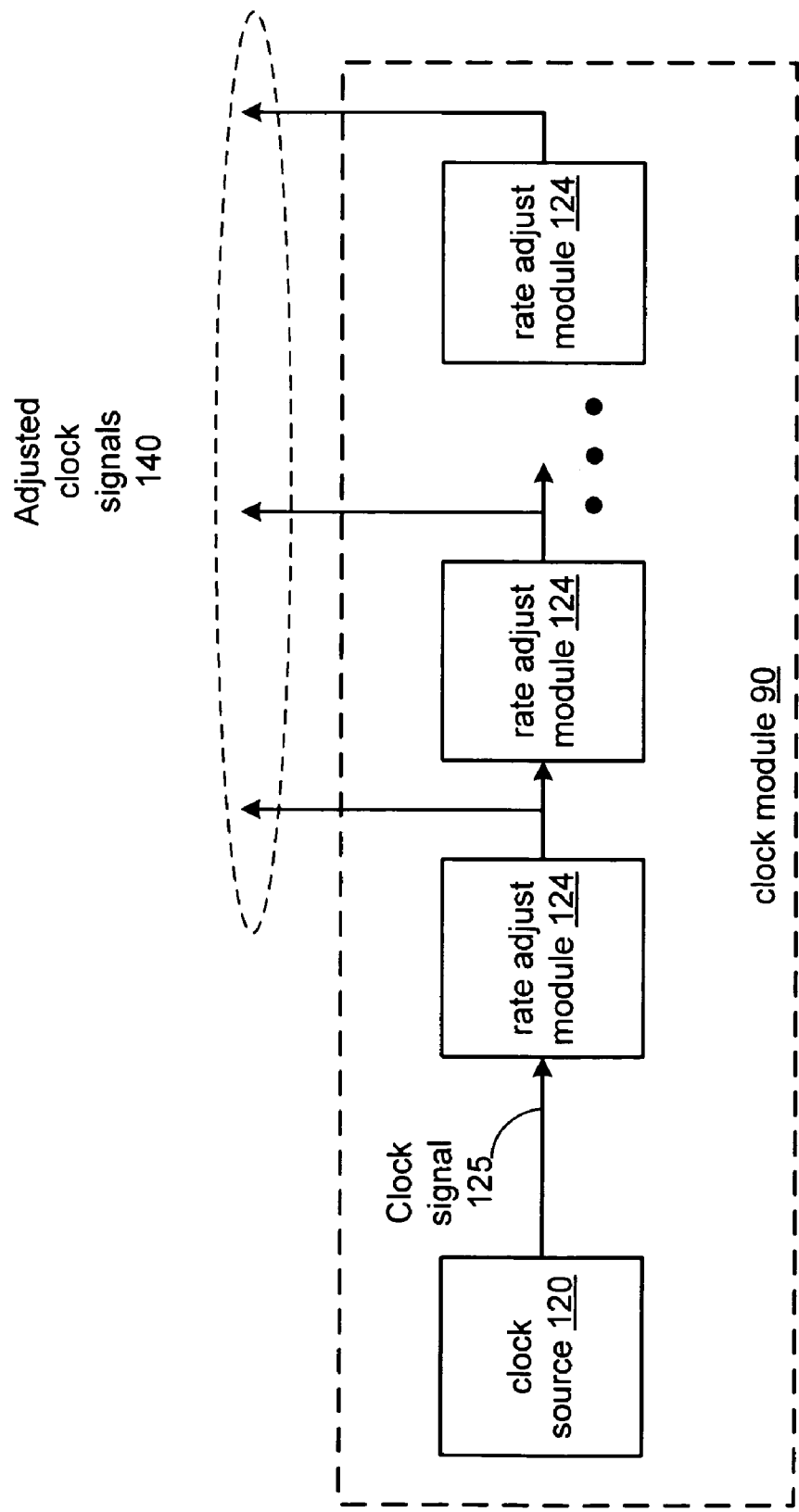
FIG. 11 is a schematic block diagram of another embodiment of a clock module in accordance with the present invention.

FIG. 11 is a schematic block diagram of another embodiment of a clock module in accordance with the present invention. In this embodiment, the rate adjust modules 124 are arranged serially, rather than the parallel configuration of FIG. 10. This embodiment is well suited for implementations where two or more of the adjusted clock signals 140 are dependent upon one another, such as by a fixed relationship. For instance, where one of the adjusted clock signals is, say four times greater than another, one of the rate adjust modules 124 can include a divide-by-four circuit. In this embodiment, one of the rate adjust modules can take responsibility to avoid interference caused by frequency dependent noise components for more than one of the adjusted clock signals 140 and make adjustments that allow one or more of the other rate adjust modules 124 to remain at a fixed relationship between its input and output.

Figure 12:
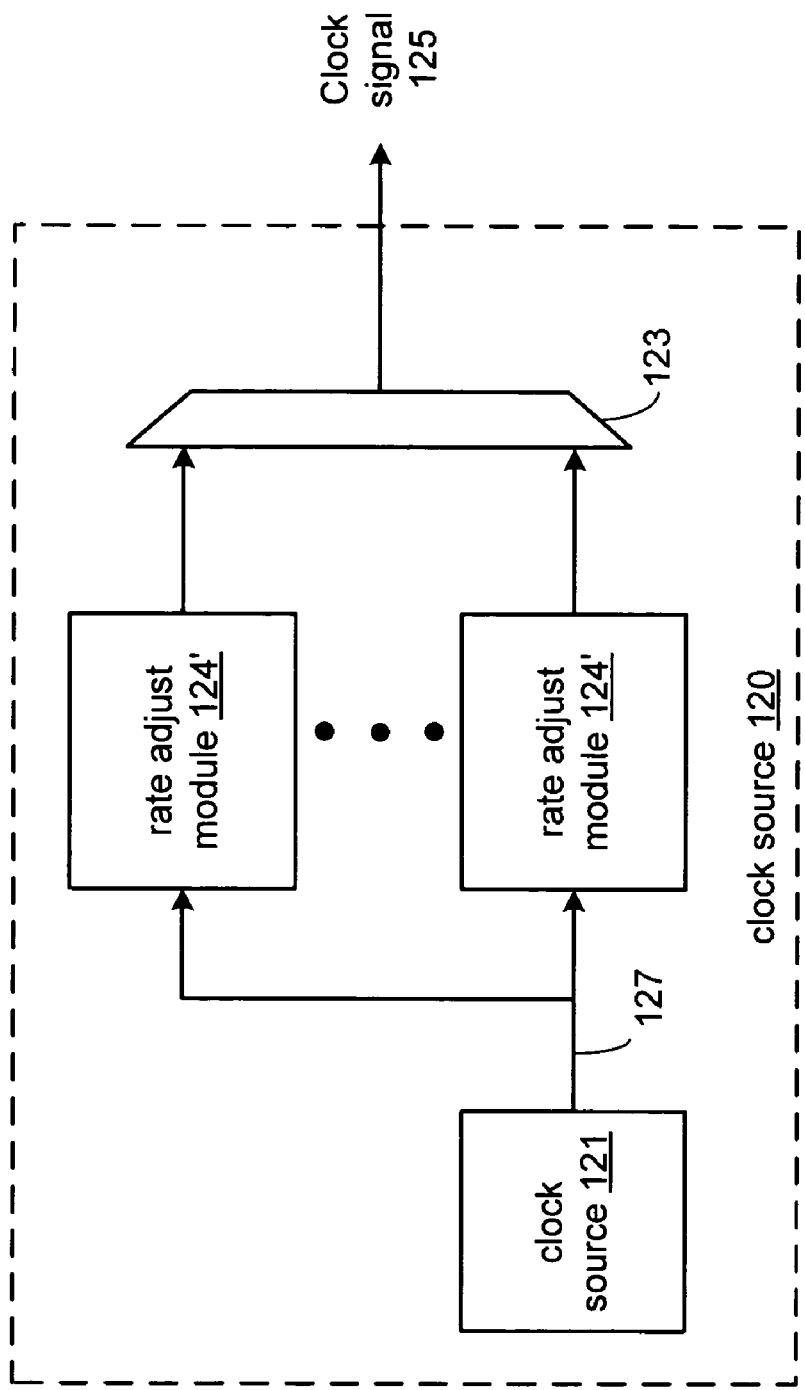
FIG. 12 is a schematic block diagram of an embodiment of a clock source in accordance with the present invention.

FIG. 12 is a schematic block diagram of an embodiment of a clock source in accordance with the present invention. In particular, a clock source 120 is shown that has a clock source 121 that can include an oscillator such as a ring-oscillator, crystal oscillator or other oscillator circuit, phase locked loop circuit, or other circuit that generates a clock signal 127. This clock signal is adjusted by rate adjust modules 124' that adjust the clock signal 127 to a plurality of different rates. Demultiplexer 123 selects a particular one of the plurality of clock signals to have a rate of the plurality of rates that, when adjusted by rate adjustment modules 124 of the clock module 90, avoids the unwanted interference. It should be noted in this embodiment, that the rate adjustment modules 124' and 124 can be implemented as predetermined or fixed rate adjustments with the frequency of clock signal 125 and of the adjusted clock signals 140, instead, varying based on a selection of a particular clock signal by demultiplexer 123.

For example, clock source 121 can generate a 26 MHz clock signal 127 that is adjusted by a first rate adjustment module 124' that multiplies the frequency by a factor of 24, to a 624 MHz clock, and by a second rate adjust module 124', that divides by 4 and multiplies by 95 to form a 617.5 MHz clock signal. Demultiplexer selects either the 624 MHz clock or the 617.5 MHz clock under control of a processor of RFIC 80 based on the particular band or channel that is being received, based on interference measurements, etc. In this example, rate adjust modules 124 of clock module 90 can include fixed dividers to generate the rate adjusted clock signals 140, such as baseband clock signals 130.

Figure 13:
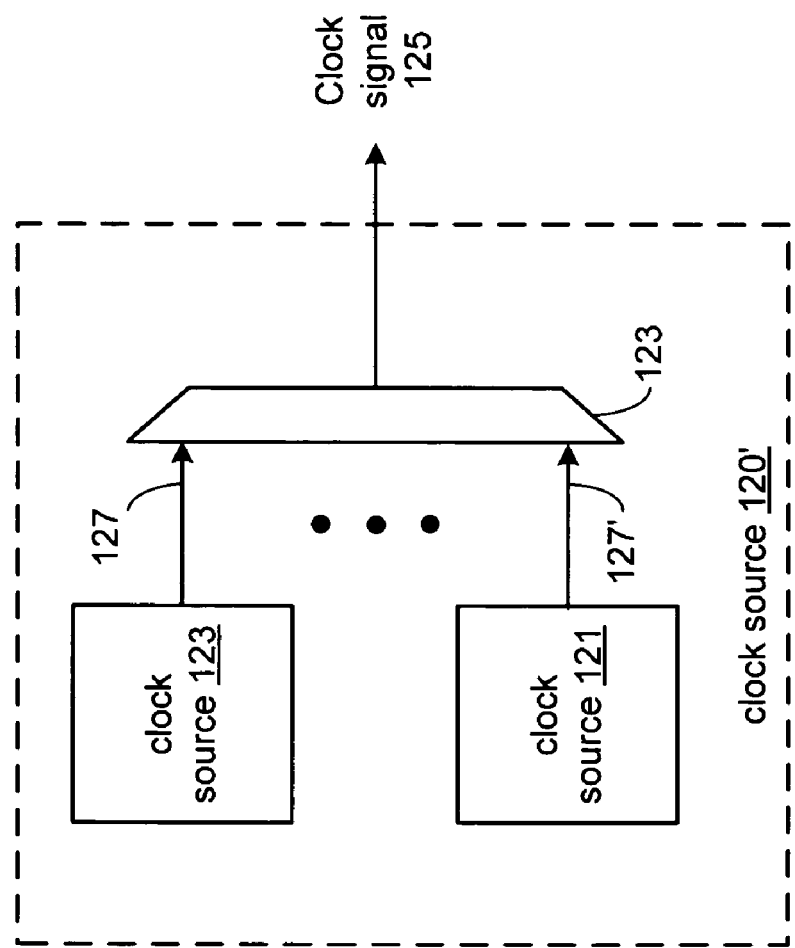
FIG. 13 is a schematic block diagram of another embodiment of a clock source in accordance with the present invention.

FIG. 13 is a schematic block diagram of another embodiment of a clock source in accordance with the present invention. In this embodiment clock source 120' includes a plurality of separate clock sources, such as clock source 121 that generates clock signal 127 and clock source 123 that generates clock signal 127'. As in the circuit of FIG. 12, demultiplexer 123 selects a particular clock signal 125 from the plurality of clock signals 127, 127', . . . to avoid potentially harmful interference.

Figure 14:
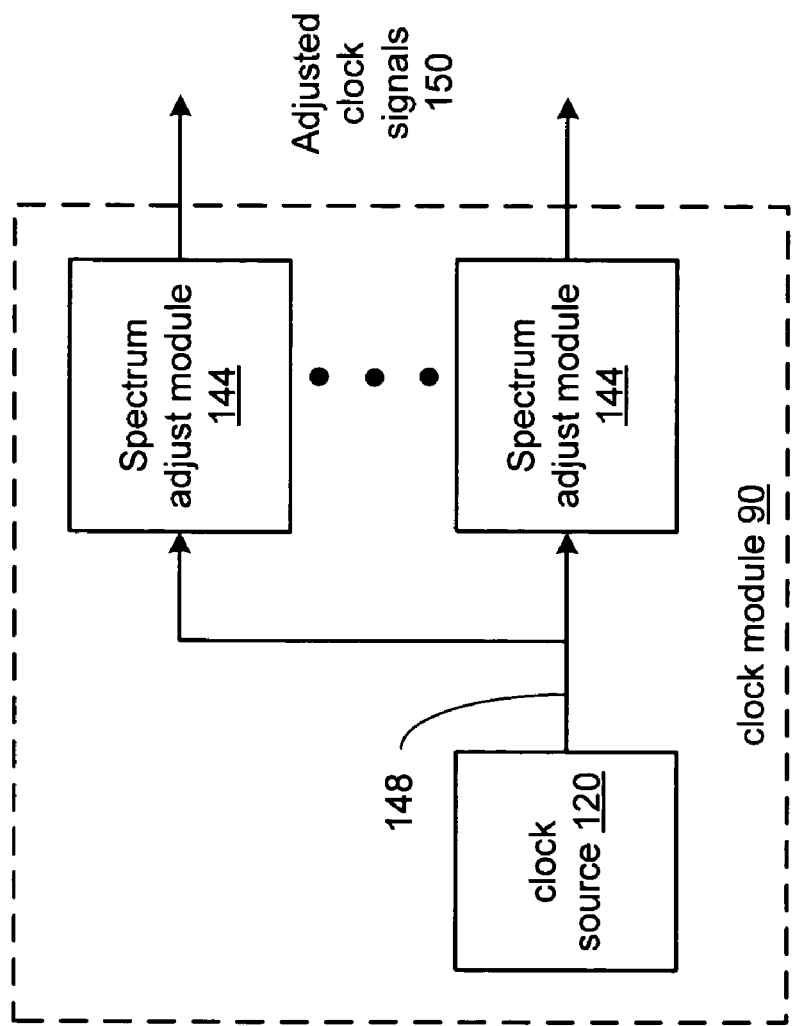
FIG. 14 is a schematic block diagram of another embodiment of a clock module in accordance with the present invention.
Figure 15:
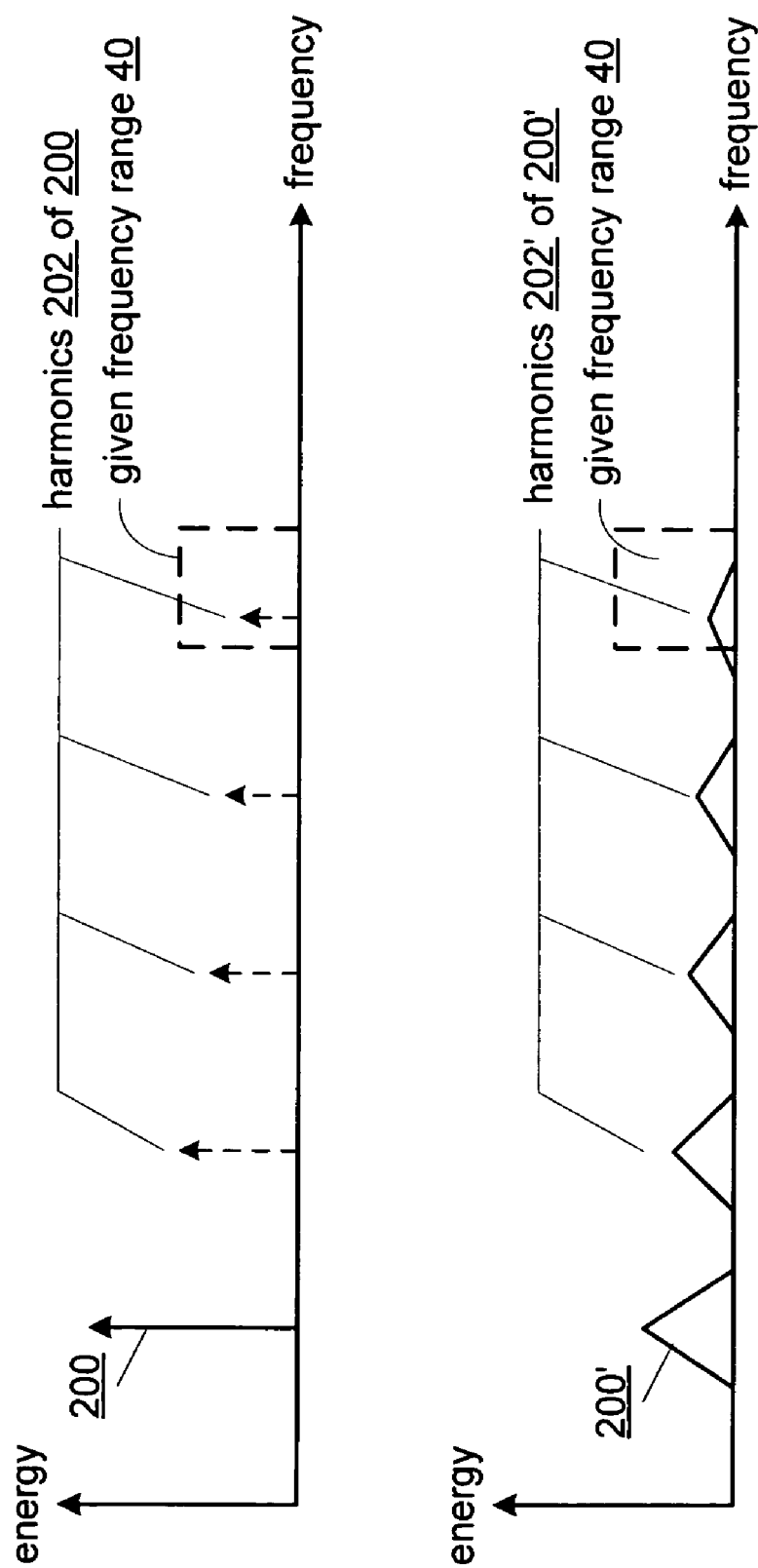
FIG. 15 is a frequency diagram of clock spectrum adjusting in accordance with the present invention.

FIG. 14 is a schematic block diagram of another embodiment of a clock module in accordance with the present invention. In this embodiment of the present invention, the clock module 90 operates to reduce the effect of the frequency dependent noise components by spreading the spectrum of one or more of the baseband clock signals 130. In particular, clock module 90 produces the plurality of adjusted clock signals 150, such as baseband clock signals 130. Clock module 90 includes a clock source 120 that generates an operation dependent clock signal 148. A plurality of spectrum adjust modules 144, optionally arranged in a parallel configuration, generate the plurality of adjusted clock signals 150 from the operation dependent clock signal 148. In operation, each of the spectrum adjust modules 144 detect an interference condition in a manner similar to rate adjust modules 122, 124, etc., either by test or calculation, when frequency dependent noise components associated the corresponding adjusted clock signals 150 are inside a frequency band associated with the inbound RF signal 92. In response, the spectrum adjust module 144 spreads the spectrum of its corresponding adjusted clock signal 150 when the interference condition is detected. In an embodiment of the present invention, each of the spectrum adjust modules includes a programmable delay line, tapped delay line, or other circuit for introducing jitter, that is either periodic, non-periodic, pseudorandom, etc. on the operation dependent clock signal 148 or that otherwise spreads the spectrum of operation dependent clock signal 148 to produce the corresponding adjusted clock signal 150. This spectrum adjust module 144 can include analog and/or digital circuits that can be implemented on an integrated circuit that may include a processing element such as a dedicated processor or shared processing function including, but not limited to a programmable logic array, digital signal processor, microprocessor, state machine, or other processing element.

In an embodiment of the present invention, the adjusted clock signals 150 further include an ADC clock signal 132 that is generated at a rate such that frequency dependent noise components associated with the ADC clock signal are outside the frequency band associated with the inbound RF signal. In an alternative embodiment, ADC clock signal 132 is generated by clock module 120 in a manner similar to the generation of the baseband clock signals 130. in particular, clock module 120 detects the interference condition when frequency dependent noise components associated with the ADC clock signal 132 are inside a frequency band associated with the inbound RF signal 92, and that spreads the spectrum of the ADC clock signal 132 when the interference condition is detected.

Figure 16:
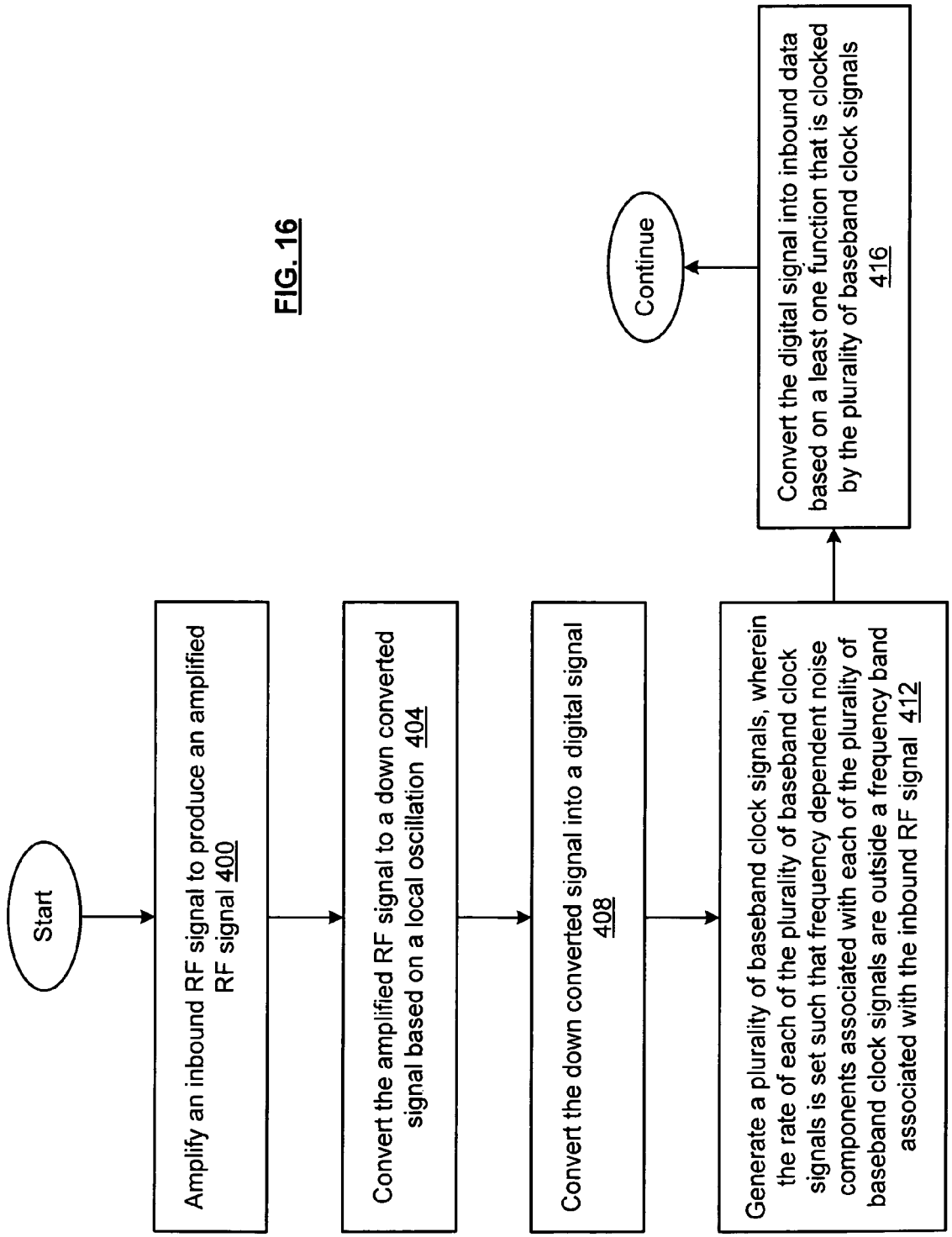
FIG. 16 is a flow chart of a method in accordance with the present invention.

FIG. 16 is a frequency diagram of clock spectrum adjusting in accordance with the present invention. In particular, a clock signal, such as operation dependent clock signal 148, is shown to have a fundamental frequency 200 and a plurality of harmonics 202. As shown one of the harmonics falls within a given frequency range, such as the passband of LNA 82, providing a potential source of noise. In response to the detection of the condition, clock module 90, such as through operation of spectrum adjust module 144, operates to introduce jitter to the clock signal to spread the spectrum of the fundamental 200 and each of the harmonic components 202 to produce the spectral components 200' and 202'. As shown, this reduces the energy of this frequency dependent noise that falls within the given frequency range 40 and lowers the magnitude of the noise at any particular frequency within the given frequency range 40, helping to reduce the impact of this source of noise.

FIG. 16 is a flow chart of a method in accordance with the present invention. In particular, a method is presented for use with one or more of the functions or features presented in conjunction with FIGS. 1-15. In step 400, an inbound is amplified to produce an amplified RF signal. In step 404, the amplified RF signal is converted to a down converted signal based on a local oscillation. In step 408, the down converted signal is converted into a digital signal. In step 412, a plurality of baseband clock signals are generated, wherein a rate of each of the plurality of baseband clock signals is set such that frequency dependent noise components associated with each of the plurality of baseband clock signals are outside a frequency band associated with the inbound RF signal. In step 416, the digital signal is converted into inbound data based on at least one function that is clocked by the plurality of baseband clock signals.

In an embodiment of the present invention, step 412 includes generating an operation dependent clock signal, and adjusting the operation dependent clock signal to produce the plurality of baseband clock signals. In addition, the at least one function that is clocked by the plurality of baseband clock signals can include one or more of the following: intermediate frequency to baseband conversion; fast Fourier transform; demapping; deinterleaving; decoding; and descrambling.

Figure 17:
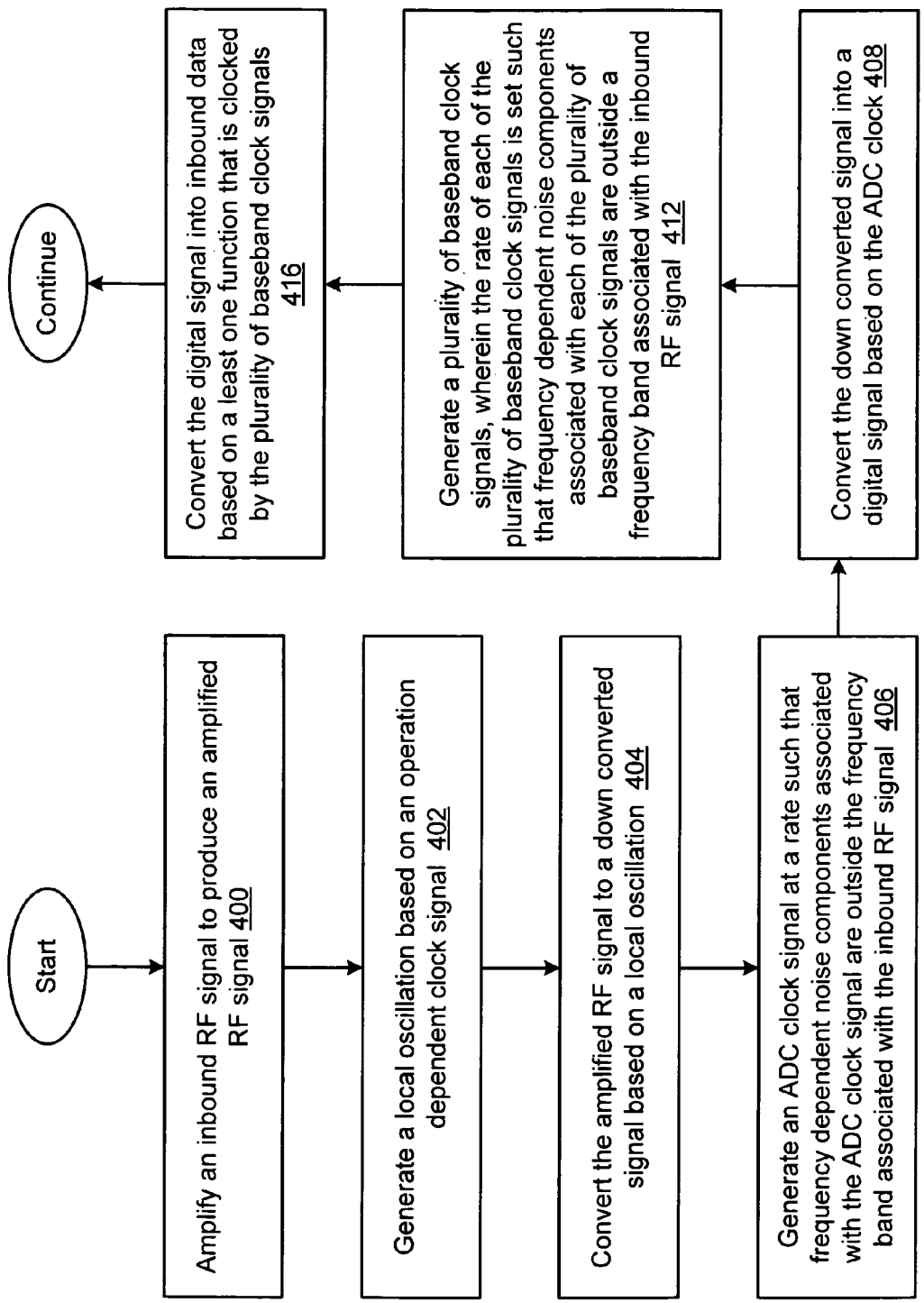
FIG. 17 is a flow chart of a method in accordance with the present invention.

FIG. 17 is a flow chart of a method in accordance with the present invention. In particular a method is presented that includes many elements of FIG. 16 that are referred to by common reference numerals. Like the method of FIG. 16, this method can be used in conjunction with one or more features or functions described in conjunction with FIGS. 1-15. In addition, this method includes step 406 of generating an analog to digital conversion (ADC) clock signal at a rate such that frequency dependent noise components associated with the ADC clock signal are outside the frequency band associated with the inbound RF signal, and step 408 is performed based on the ADC clock signal that is generated. Further the method includes step 402 of generating the local oscillation based on an operation dependent clock signal. In an embodiment of the present invention, step 404 further includes mixing the local oscillation with the amplified RF signal to produce first and second mixed signals, and filtering the first and second mixed signals to produce an in-phase component and a quadrature component of the down converted signal.

Figure 18:
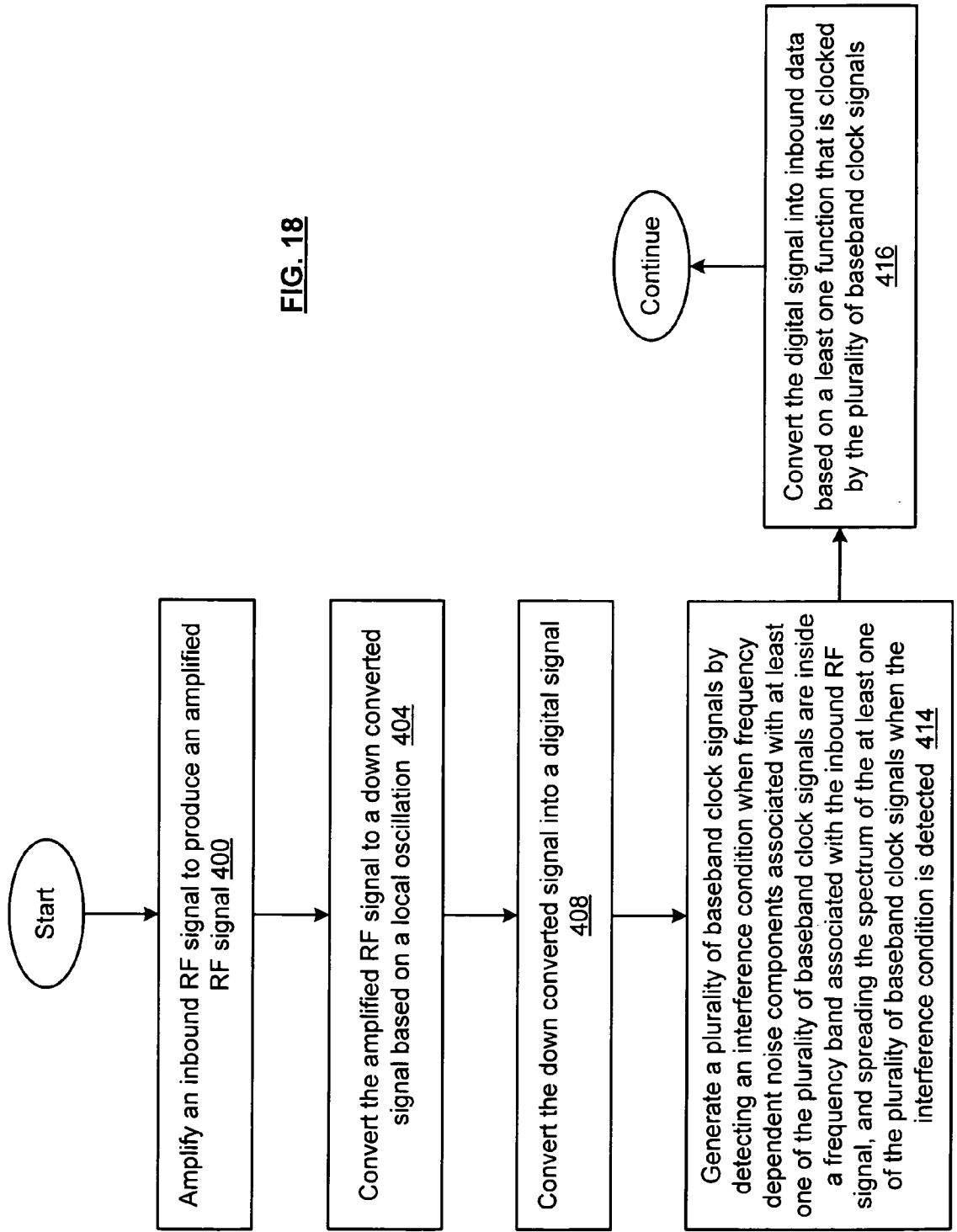
FIG. 18 is a flow chart of a method in accordance with the present invention.

FIG. 18 is a flow chart of a method in accordance with the present invention. In particular a method is presented that includes many of common elements of the method of FIG. 16 that are referred to by common reference numerals. Like the method of FIG. 16, this method can be used in conjunction with one or more features or functions described in conjunction with FIGS. 1-15. In addition, the method includes step 414 of generating a plurality of baseband clock signals, by detecting an interference condition when frequency dependent noise components associated with at least one of the plurality of baseband clock signals are inside a frequency band associated with the inbound RF signal, and spreading the spectrum of the at least one of the plurality of baseband clock signals when the interference condition is detected.

In an embodiment of the present invention, step 414 includes generating an operation dependent clock signal, and spreading the spectrum of the operation dependent clock signal to produce the plurality of baseband clock signals. In addition, the at least one function that is clocked by the plurality of baseband clock signals can includes at least one of: intermediate frequency to baseband conversion; fast Fourier transform; demapping; deinterleaving; decoding; and descrambling.

Figure 19:
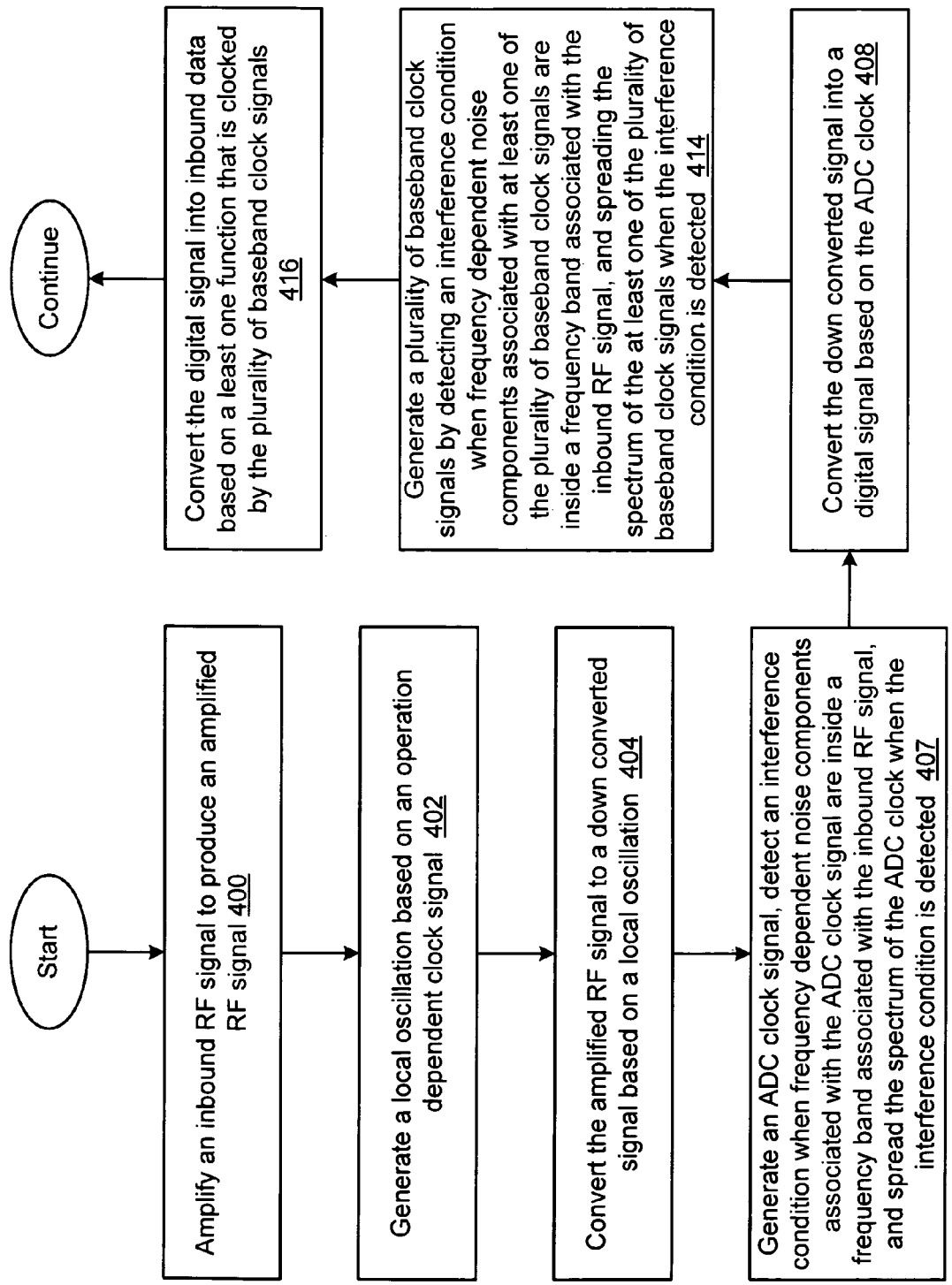
FIG. 19 is a flow chart of a method in accordance with the present invention.

FIG. 19 is a flow chart of a method in accordance with the present invention. In particular a method is presented that includes many of common elements of the method of FIG. 17 that are referred to by common reference numerals. Like the method of FIG. 17, this method can be used in conjunction with one or more features or functions described in conjunction with FIGS. 1-15. In addition this method includes step 406 of generating an analog to digital conversion (ADC) clock signal at a rate such that frequency dependent noise components associated with the ADC clock signal are outside the frequency band associated with the inbound RF signal.

Figure 20:
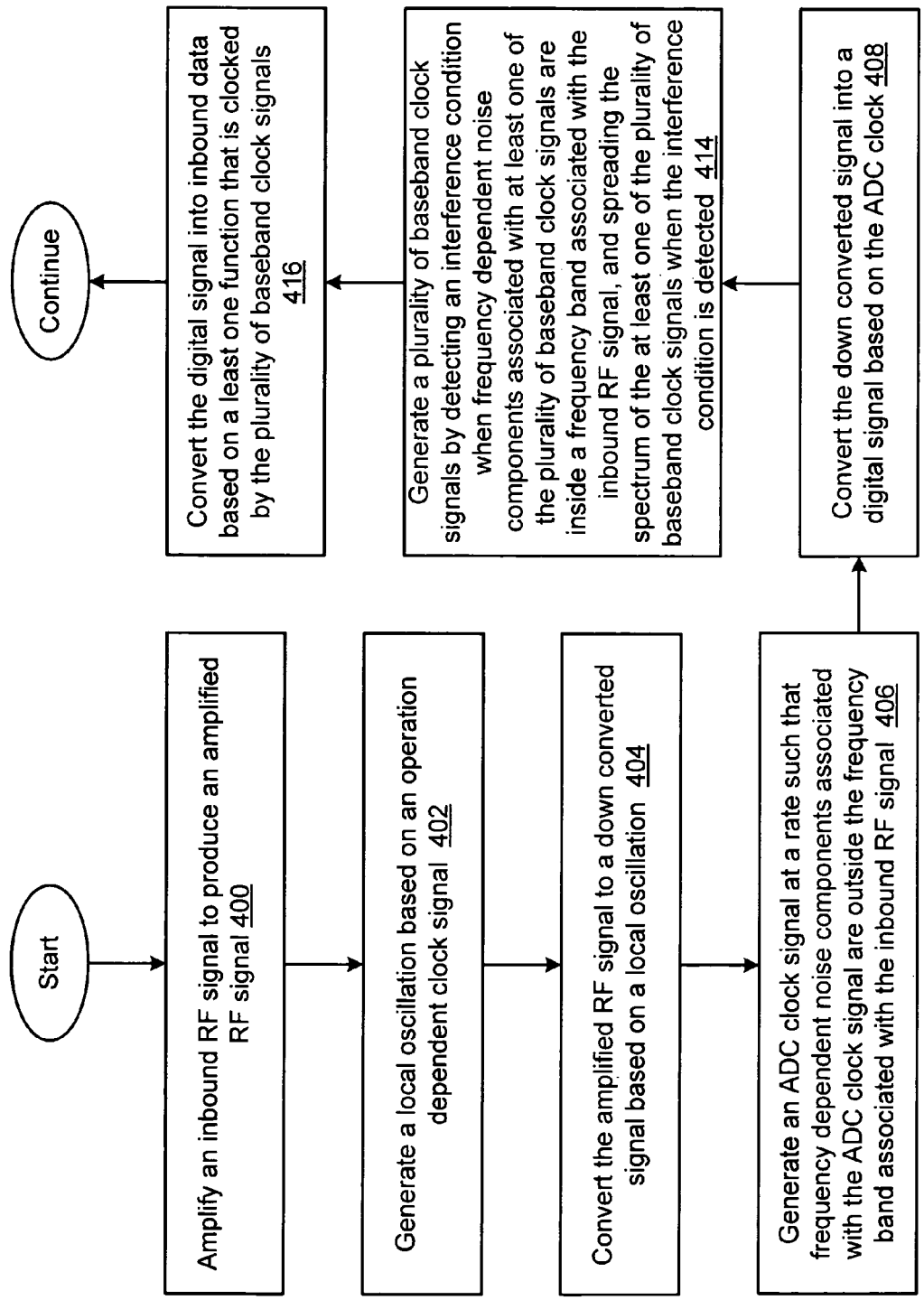
FIG. 20 is a flow chart of a method in accordance with the present invention.
Figure 21:
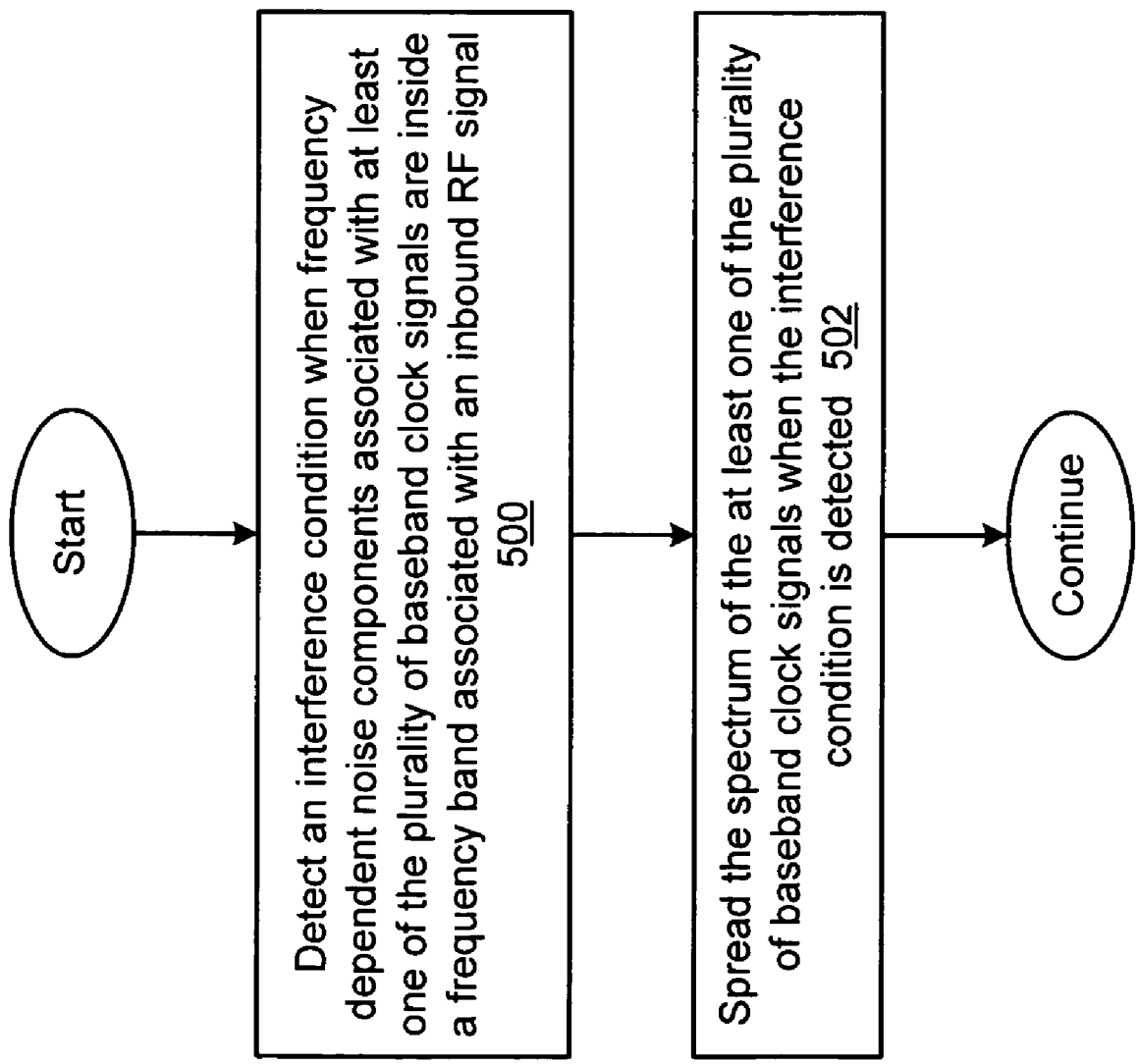
FIG. 21 is a flow chart of a method in accordance with the present invention.

FIG. 20 is a flow chart of a method in accordance with the present invention. In particular a method is presented that includes many of common elements of the method of FIG. 17 that are referred to by common reference numerals. Like the method of FIG. 17, this method can be used in conjunction with one or more features or functions described in conjunction with FIGS. 1-15. In addition, this method includes step 407 of generating an analog to digital conversion (ADC) clock signal, detecting the interference condition when frequency dependent noise components associated with the ADC clock signal are inside a frequency band associated with the inbound RF signal, and spreading the spectrum of the ADC clock signal when the interference condition is detected;

FIG. 21 is a flow chart of a method in accordance with the present invention. This method can be used in conjunction with one or more features or functions described in conjunction with FIGS. 1-20. In step 500 an interference condition is detected when frequency dependent noise components associated with at least one of the plurality of baseband clock signals are inside a frequency band associated with an inbound RF signal. In step 502, the spectrum of the at least one of the plurality of baseband clock signals when the interference condition is detected.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency integrated circuit (RFIC) comprising:
    a low noise amplifier coupled to amplify an inbound radio frequency (RF) signal to produce an amplified RF signal;
    a down conversion module coupled to convert the amplified RF signal to a down converted signal based on a local oscillation;
    an analog to digital conversion (ADC) module coupled to convert the down converted signal into a digital signal;
    a baseband processing module coupled to convert the digital signal into inbound data, wherein at least one function of the baseband processing module is clocked by a plurality of baseband clock signals wherein the at least one function of the baseband processing module includes at least one of intermediate frequency to baseband conversion, fast Fourier transform, demapping, deinterleaving, decoding, and descrambling; and
    a clock module coupled to produce the plurality of baseband clock signals, wherein the clock module detects an interference condition when frequency dependent noise components associated with at least one of the plurality of baseband clock signals are inside a frequency band associated with the inbound RF signal, and that spreads the spectrum of the at least one of the plurality of baseband clock signals when the interference condition is detected.

2. The RFIC of claim 1 wherein the ADC conversion module is clocked by an ADC clock signal and wherein the clock module produces the ADC clock signal at a rate such that frequency dependent noise components associated with the ADC clock signal are outside the frequency band associated with the inbound RF signal.

3. The RFIC of claim 1 wherein the ADC conversion module is clocked by an ADC clock signal and wherein the clock module detects the interference condition when frequency dependent noise components associated with the ADC clock signal are inside a frequency band associated with the inbound RF signal, and that spreads the spectrum of the ADC clock signal when the interference condition is detected.

4. The RFIC of claim 3, wherein the down conversion module comprises:
    a local oscillation module coupled to generate the local oscillation based on the operation dependent clock signal.

5. The RFIC of claim 4, wherein the down conversion module further comprises:
- a mixing module coupled to mix the local oscillation with the amplified RF signal to produce first and second mixed signals; and
- a filtering module coupled to filter the first and second mixed signals to produce an in-phase component and a quadrature component of the down converted signal.

6. The RFIC of claim 1, wherein the clock module comprises:
- a clock source that generates an operation dependent clock signal; and
- a plurality of spectrum adjust modules, that generate the plurality of baseband clock signals from the operation dependent clock signal.

7. The RFIC of claim 6 wherein the plurality of spectrum adjust modules are arranged in a parallel configuration.

8. A radio frequency integrated circuit (RFIC) comprising:
- a low noise amplifier coupled to amplify an inbound radio frequency (RF) signal to produce an amplified RF signal;
- a down conversion module coupled to convert the amplified RF signal to a down converted signal based on a local oscillation;
- an analog to digital conversion (ADC) module coupled to convert the down converted signal into a digital signal;
- a baseband processing module coupled to convert the digital signal into inbound data, wherein at least one function of the baseband processing module is clocked by a plurality of baseband clock signals; and
- a clock module coupled to produce the plurality of baseband clock signals, wherein the clock module detects an interference condition when frequency dependent noise components associated with at least one of the plurality of baseband clock signals are inside a frequency band associated with the inbound RF signal, and that spreads the spectrum of the at least one of the plurality of baseband clock signals when the interference condition is detected.

9. The RFIC of claim 8 wherein the ADC conversion module is clocked by an ADC clock signal and wherein the clock module produces the ADC clock signal at a rate such that frequency dependent noise components associated with the ADC clock signal are outside the frequency band associated with the inbound RF signal.

10. The RFIC of claim 8 wherein the ADC conversion module is clocked by an ADC clock signal and wherein the clock module detects the interference condition when frequency dependent noise components associated with the ADC clock signal are inside a frequency band associated with the inbound RF signal, and that spreads the spectrum of the ADC clock signal when the interference condition is detected.

11. The RFIC of claim 8, wherein the clock module comprises:
- a clock source that generates an operation dependent clock signal; and
- a plurality of spectrum adjust modules, that generate the plurality of baseband clock signals from the operation dependent clock signal.

12. The RFIC of claim 11 wherein the plurality of spectrum adjust modules are arranged in a parallel configuration.

13. The RFIC of claim 8, wherein the down conversion module comprises:
- a local oscillation module coupled to generate the local oscillation based on the operation dependent clock signal.

14. The RFIC of claim 13, wherein the down conversion module further comprises:
- a mixing module coupled to mix the local oscillation with the amplified RF signal to produce first and second mixed signals; and
- a filtering module coupled to filter the first and second mixed signals to produce an in-phase component and a quadrature component of the down converted signal.

15. The RFIC of claim 8, wherein the baseband processing module is operable to perform at least one of:
- intermediate frequency to baseband conversion;
- fast Fourier transform;
- demapping;
- deinterleaving;
- decoding; and
- descrambling.

16. A method comprising:
- amplifying an inbound radio frequency (RF) signal to produce an amplified RF signal;
- converting the amplified RF signal to a down converted signal based on a local oscillation;
- converting the down converted signal into a digital signal;
- generating a plurality of baseband clock signals, by detecting an interference condition when frequency dependent noise components associated with at least one of the plurality of baseband clock signals are inside a frequency band associated with the inbound RF signal, and spreading the spectrum of the at least one of the plurality of baseband clock signals when the interference condition is detected; and
- converting the digital signal into inbound data based on at least one function that is clocked by the plurality of baseband clock signals.

17. The method of claim 16 further comprising
- generating an analog to digital conversion (ADC) clock signal at a rate such that frequency dependent noise components associated with the ADC clock signal are outside the frequency band associated with the inbound RF signal;
- wherein the step of converting the down converted signal into a digital signal is performed based on the ADC clock signal.

18. The method of claim 16 further comprising
- generating an analog to digital conversion (ADC) clock signal;
- detecting the interference condition when frequency dependent noise components associated with the ADC clock signal are inside a frequency band associated with the inbound RF signal; and
- spreading the spectrum of the ADC clock signal when the interference condition is detected;
- wherein the step of converting the down converted signal into a digital signal is performed based on the ADC clock signal.

19. The method of claim 18, further comprising:
- generating the local oscillation based on an operation dependent clock signal.

20. The method of claim 16, wherein the step of generating the plurality of baseband clock signals includes generating an operation dependent clock signal, and spreading the spectrum of the operation dependent clock signal to produce the plurality of baseband clock signals.

21. The method of claim 20, wherein the step of converting the amplified RF signal to a down converted signal further comprises:
- mixing the local oscillation with the amplified RF signal to produce first and second mixed signals; and filtering the first and second mixed signals to produce an in-phase component and a quadrature component of the down converted signal.

22. The method of claim 16, wherein the at least one function that is clocked by the plurality of baseband clock signals includes at least one of:
intermediate frequency to baseband conversion;
fast Fourier transform;
demapping;
deinterleaving;
decoding; and
descrambling.

23. A method for generating a plurality of baseband clock signals, the method comprising:
detecting an interference condition when frequency dependent noise components associated with at least one of the plurality of baseband clock signals are inside a frequency band associated with an inbound RF signal; and
spreading the spectrum of the at least one of the plurality of baseband clock signals when the interference condition is detected.

* * * * *

UNITED STATES PATENT AND TRADEMARK OFFICE
CERTIFICATE OF CORRECTION

| | |
|---|---|
| PATENT NO. | : 7,787,569 B2 |
| APPLICATION NO. | : 11/641562 |
| DATED | : August 31, 2010 |
| INVENTOR(S) | : Frederic Christian Marc Hayem |

It is certified that error appears in the above-identified patent and that said Letters Patent is hereby corrected as shown below:

Col. 18, line 34, in Claim 17: after "comprising", insert --:--
Col. 18, line 43, in Claim 18: after "comprising", insert --:--

Signed and Sealed this
Twenty-fourth Day of April, 2012

David J. Kappos
*Director of the United States Patent and Trademark Office*